US010891576B2

(12) United States Patent
Diaz et al.

(10) Patent No.: US 10,891,576 B2
(45) Date of Patent: Jan. 12, 2021

(54) SYSTEM AND METHOD FOR RECOMMENDING A TRANSACTION TO REPLACE A DEVICE BASED UPON TOTAL COST OF OWNERSHIP

(71) Applicant: gabi Solutions, Inc., Fairfield, NJ (US)

(72) Inventors: Luis J. Diaz, Chester, NJ (US); Norman Sherman, Fair Lawn, NJ (US)

(73) Assignee: gabi Solutions, Inc., Fairfield, NJ (US)

( * ) Notice: Subject to any disclaimer, the term of this patent is extended or adjusted under 35 U.S.C. 154(b) by 0 days.

(21) Appl. No.: 16/222,448

(22) Filed: Dec. 17, 2018

(65) Prior Publication Data

US 2019/0370717 A1    Dec. 5, 2019

Related U.S. Application Data

(63) Continuation-in-part of application No. 16/135,202, filed on Sep. 19, 2018, which is a continuation-in-part of application No. 16/029,191, filed on Jul. 6, 2018, which is a continuation-in-part of application No. 15/997,236, filed on Jun. 4, 2018, now Pat. No. 10,430,125.

(51) Int. Cl.
| | | |
|---|---|---|
| *G06Q 10/06* | (2012.01) | |
| *G06Q 30/02* | (2012.01) | |
| *G06Q 30/06* | (2012.01) | |
| *H04N 1/00* | (2006.01) | |
| *G06F 3/12* | (2006.01) | |

(52) U.S. Cl.
CPC ..... *G06Q 10/06375* (2013.01); *G06F 3/1218* (2013.01); *G06F 3/1229* (2013.01); *G06F 3/1292* (2013.01); *G06Q 30/0283* (2013.01); *G06Q 30/0631* (2013.01); *H04N 1/00042* (2013.01)

(58) Field of Classification Search
CPC ......... G06Q 10/06375; G06Q 30/0283; G06Q 30/0631; G06F 3/1292; G06F 3/1218; G06F 3/1229; H04N 1/00042
See application file for complete search history.

(56) References Cited

U.S. PATENT DOCUMENTS

| | | | |
|---|---|---|---|
| 6,088,717 A | 7/2000 | Reed et al. | |
| 9,477,737 B1 | 10/2016 | Charyk et al. | |
| 2004/0122625 A1 | 6/2004 | Nasser et al. | |
| 2004/0215533 A1 | 10/2004 | Doeberl et al. | |
| 2005/0038724 A1 | 2/2005 | Roever et al. | |
| 2005/0071348 A1 | 3/2005 | Laicher et al. | |
| 2006/0178917 A1* | 8/2006 | Merriam | G06Q 10/06312 705/7.22 |

(Continued)

OTHER PUBLICATIONS

The International Search Report and Written Opinion, dated Apr. 23, 2019, in the related PCT Appl. No. PCT/US18/66000.

(Continued)

*Primary Examiner* — Iriana Cruz

(57) ABSTRACT

A method and system for recommending a transaction to replace a target device by calculating a total cost of ownership based upon actual device usage data. Based, at least in part, on the TCO for the target device, a recommendation is provided to replace the target device with a replacement device that has a lower TCO than the target device, or a TCO difference compared to the TCO of the target device that is within a predefined range.

12 Claims, 29 Drawing Sheets

(56) References Cited

U.S. PATENT DOCUMENTS

| | | | |
|---|---|---|---|
| 2012/0060142 A1 | 3/2012 | Fliess et al. | |
| 2012/0262749 A1 | 10/2012 | Yamamoto | |
| 2013/0162411 A1 | 6/2013 | Moses et al. | |
| 2013/0342866 A1 | 12/2013 | Hansen et al. | |
| 2016/0277439 A1 | 9/2016 | Rotter et al. | |
| 2017/0012961 A1 | 1/2017 | White et al. | |
| 2017/0046698 A1 | 2/2017 | Haldenby et al. | |
| 2017/0280003 A1 | 9/2017 | Haba et al. | |
| 2017/0352071 A1* | 12/2017 | Carey | H04L 12/2825 |
| 2018/0174207 A1* | 6/2018 | Potucek | G06Q 30/0283 |
| 2019/0087762 A1* | 3/2019 | Ranjan | G06Q 30/0283 |
| 2020/0118142 A1* | 4/2020 | Mukunya | G06Q 30/06 |

OTHER PUBLICATIONS

The International Search Report and Written Opinion, dated Feb. 14, 2019, in the related PCT Appl. No. PCT/US2018/035863.
The International Search Report and Written Opinion, dated Jan. 24, 2019, in the related PCT Appl. No. PCT/US18/51648.

* cited by examiner

SYSTEM AND METHOD FOR RECOMMENDING A TRANSACTION TO REPLACE A DEVICE BASED UPON TOTAL COST OF OWNERSHIP

CROSS-REFERENCE TO RELATED APPLICATIONS

This application is a continuation-in-part of U.S. patent application Ser. No. 16/135,202, filed on Sep. 19, 2018, entitled "System and Method for Securely Accessing, Manipulating and Controlling Documents and Devices Using Natural Language Processing" and now issued on Oct. 20, 2020 as U.S. Pat. No. 10,812,680, which is a continuation-in-part of U.S. patent application Ser. No. 16/029,191, filed on Jul. 6, 2018, entitled "System and Method for Providing User-Centric Content to an Electronic Device" and now issued on Sep. 1, 2020 as U.S. Pat. No. 10,762,058, which is a continuation-in-part of U.S. patent application Ser. No. 15/997,236, filed on Jun. 4, 2018, entitled "System, Network Architecture and Method for Accessing and Controlling and Electronic Device" and now issued on Oct. 1, 2019 as U.S. Pat. No. 10,430,125. Each of these applications is hereby incorporated by reference in its entirety herein.

FIELD OF THE INVENTION

The present invention is directed to a system and method for recommending a transaction to replace a device based upon a total cost of ownership analysis.

BACKGROUND OF THE INVENTION

Electronic devices are continually getting "smarter" as greater processing power becomes available in smaller and smaller packages. With many types of electronic devices now ubiquitously part of personal and professional life, these devices occupy a unique position in our lives. They provide an easy-to-use, powerful tool that can be used to improve, and even to introduce paradigm shifts to how certain things are done. Listening to music is one simple example. This example alone presents endless opportunity for applications on a smartphone or other user electronic devices.

It seems, however, that most of the productivity improvements introduced through devices like personal devices like the smartphone are personal, rather than professional. It's easier to find things like restaurants, stores, etc. using navigation features of a smartphone. It's easier to keep in touch through phone calls, text messaging, social network accounts like Twitter and Facebook, and email. It's easier to take and share pictures. And myriad other applications that attempt to improve personal life. Professional life has not been overlooked, but it seems that the improvements here are more limited in type, scope and impact. For example, it's also easier to keep in touch professionally through phone calls, text messaging and email. It's easier to maintain professional contacts and to gain access to those contacts anytime, anywhere. It seems, however, that the professional improvements brought about through the portability and availability of computer processing power have not presented a significant shift in how business is done. Professional improvements seem to fall into the category of improved efficiency, but certainly nothing considered to be at the level of a paradigm shift. There remain many opportunities for such improvements to professional life that are possible with more intelligent personal electronic devices like the smartphone.

Electronic devices tend to be designed and configured for a particular purpose or function. While electronic devices may be multi-function devices, e.g., a multi-function printer, a smart phone that can make phone calls, takes pictures and play music, the function(s) are typically pre-programmed, and a user of the device is limited to these pre-programmed functions. However, because an electronic device is preprogrammed for a particular function or functions does not mean those are the only functions the device is capable of performing. To the contrary, many electronic devices are capable of performing functions for which they are not programmed. Unfortunately, a user is limited to the preprogrammed and available functions of an electronic device unless the user pays to upgrade the device to enhance and/or expand its functionality. It is currently not possible for a user, in real-time, to use a personal electronic device like a smartphone to access and control a target electronic device in a way that changes the function or functionality of the target device.

Consider a multi-function printer ("MFP"), as one example. Although this device is configured to perform certain functions, e.g., print, scan, copy, email, it is also able to perform functions beyond these. For example, a typical MFP is capable of scanning a document and sending it via email by accessing an address book stored in the MFP provided that the user is in front of the MFP and directly controlling it. Thus it is possible for an MFP to email documents using its own address book and only using document it scans. These functions of the MFP, as examples, are available but limited by the preprogrammed configuration of the MFP.

In addition, an MFP has on-board intelligence beyond what is necessary to control the core functions of the printer. MFPs have networking functionality, enabling direct or wireless connection to a network, and authorization functionality to prevent unauthorized use of or access to the MFP, as two examples.

In addition to the above-noted shortcomings of the prior art, it is also currently not possible for one other than the MFP manufacturer or authorized service personnel to access significant types and amounts of data captured by an MFP, and use that data to intelligently manage the use and operation of the MFP. It is also currently not possible to create automatic service events for an MFP based upon usage data and most anticipated or most common service requirements. It is also currently not possible to remotely construct and control custom operations for an MFP such as, by way of non-limiting example, a custom print job that involves a sequence of discrete steps carried out by the MFP with or without user interaction.

We now consider a particular problem of note. Specifying a replacement device using prior art methods, systems, etc. is typically based on criteria provided by the entity replacing the device (e.g., IT professional, sales professional, small business owner, consumer, etc.). It is rudimentary, at best, and only considers device specifications and generalized or assumed usage requirements. Consequently, any cost of ownership calculation for a proposed replacement device will be based upon generalities and assumptions—not actual usage data. Whether a replacement device is well-suited for the user's actual usage requirements can only be determined after-the-fact. It's not uncommon for devices to be over and/or under-specified because actual usage data is not considered during the purchase, installation or replacement processes. In addition to resulting in device purchases that may not be well-suited for their actual uses, it is currently not possible to calculate an accurate total cost of ownership, as actual device usage data is not factored into that calculation.

A further shortcoming of the prior art relates to the sales cycle for devices. This process is reactive on the part of the buyer, seller or both. For leased devices, the sales process (i.e., the replacement process) begins as the end of the lease term approaches. Either the buyer (i.e., the device owner/lessee) or seller reach out to the other to begin discussing replacement devices. This discussion typically involves the needs/desires of the buyer as compared with the product offerings of the seller. Cost may be a factor in the discussion, but that is typically cost to lease/buy, which is not a total cost of ownership. While the cost of service via a service contract can be included in the cost, this too fails to accurately reflect a true total cost of ownership because it fails to consider usage requirements based upon actual usage data. Service cost calculations for a replacement device are thus generalized and inaccurate.

In addition, the prior art lacks a system and/or method for brokering a transaction between a current device owner/lessee and a potential buyer for that device that matches the current device with the potential buyer based upon device specifications and a total cost of ownership of the device that factors in actual usage data of the device and matches that actual usage data to data provided by the potential buyer about the buyer's usage requirements.

What is lacking in the prior art is a system and/or method that addresses and/or overcomes the above-described shortcomings of the prior art.

SUMMARY OF THE INVENTION

The present invention is directed to solving the technical problem of replacing a target device with a replacement device based upon actual device usage data. In accordance with embodiments of the present invention, actual device usage data for the target device is collected, stored, analyzed and used to calculate a total cost of ownership ("TCO") for that device. Based, at least in part, on the TCO for the target device, the present invention is directed to provide a recommendation to replace the target device with a replacement device that has a lower TCO than the target device, or preferably a TCO difference compared to the TCO of the target device that is within a predefined range. In either case, the TCO is calculated using actual usage data collected from a currently installed device. The present invention is further directed to a method and system for brokering a transaction between a seller/lessee of a target device and a potential buyer for a replacement device having specifications, including a TCO specification, that are the same as or similar to those of the target device. The method and system can thus match a buyer with a seller based upon the buyer's usage data—which is incorporated into the buyer's TCO specification—and the specifications of the device being sold. It should be noted that although the examples described herein is a buy/sell transaction, it should be clear to a person skilled in the art from the disclosure provided herein that the methods and system are not limited in applicability to such a transaction, and other types of transactions (e.g., lease) are contemplated by and within the scope and spirit of the present invention.

By using actual device usage data, it is possible to identify, specify, determine, etc. a replacement device that is better-suited for the actual device usage (as known from the collected device usage data) than the target device, and that results in a lower total cost of ownership. In accordance with embodiments of the present invention, such a process is automated, enabling acceleration of sales, and optimization of device deployment and usage.

An embodiment of the present invention is directed to a method for recommending a transaction to replace a device based upon a total cost of ownership of the device determined using usage data of the device. The method comprises the steps of determining a replacement device based upon at least one of user input and the usage data of the device, determining a total cost of ownership of the replacement device based upon the usage data of the device, comparing the total cost of ownership of the replacement device and the total cost of ownership of the device, and providing a recommendation for a transaction to replace the device with the replacement device when the total cost of ownership of the replacement device is less than or equal to the total cost of ownership of the device.

The method according to this embodiment of the present invention further comprises the steps of receiving the usage data and causing the usage data to be stored at a location remote from the device.

The method according to this embodiment of the present invention further comprises the step of providing a data collection device capable of collecting usage data from the device and causing the usage data to be stored at the location remote from the device.

In accordance with this embodiment of the present invention, the usage data of the device comprises at least one of job usage, time of usage, device component usage, or volume usage data.

The method according to this embodiment of the present invention further comprises the step of creating a device usage profile based upon the usage data, the device usage profile containing a characteristic of the device.

In accordance with this embodiment of the present invention, a replacement device profile for at least one replacement device contains characteristics of the replacement device, and the step of determining a replacement device further comprises comparing the device usage profile with the replacement device profile and determining the replacement device when the characteristic of the replacement device contained in the replacement device profile is similar to a characteristic of the device contained in the usage device profile.

In accordance with this embodiment of the present invention, the device is connectable to a network, and the data collection device comprises a smart box connectable to the network, the smart box having a processor and memory storing general purpose software and smart box special purpose software.

In accordance with this embodiment of the present invention, the step of causing the usage data to be stored comprises causing the usage data to be stored in memory of a server remote from the device.

In accordance with this embodiment of the present invention, the server has server special purpose software installed in server memory and configured to cause a server processor to perform at least one of the steps of determining a replacement device, determining a total cost of ownership of the replacement device, comparing the total cost of ownership, or providing a recommendation for a transaction to replace the device, is carried out by the server special purpose software.

The method according to this embodiment of the present invention further comprises the step of providing a user interface for display on a user device, the user interface enabling a user of the user device to access information about the device.

The method according to this embodiment of the present invention further comprises the step of collecting usage data of the device.

Another embodiment of the present invention is directed to method for recommending a transaction to replace a device based upon the total cost of ownership of the device determined using usage data of the device. The method of this embodiment comprises the steps of receiving a target total cost of ownership savings value, determining a replacement device based upon one of user input and the usage data of the device, determining a total cost of ownership of the replacement device based upon the usage data of the device, comparing the total cost of ownership of the replacement device and the total cost of ownership of the device, and providing a recommendation for a transaction to replace the device with the replacement device when the difference between the total cost of ownership of the replacement device and the total cost of ownership of the device is greater than or equal to the total cost of ownership savings value.

The method according to this embodiment of the present invention further comprises the steps of receiving the usage data and causing the usage date to be stored at a location remote from the device.

The method according to this embodiment of the present invention further comprises the steps of providing a data collection device capable of collecting usage data from the device and causing the usage data to be stored at the location remote from the device.

In accordance with this embodiment of the present invention, the usage data of the device comprises at least one of type of job usage, time of usage, device component usage, and volume usage.

The method according to this embodiment of the present invention further comprises the step of creating a device usage profile based upon the usage data, the device usage profile containing a characteristic of the device.

In accordance with this embodiment of the present invention, a replacement device profile for at least one replacement device contains characteristics of the replacement device, and the step of determining a replacement device further comprises comparing the device usage profile with the replacement device profile and determining the replacement device when the characteristic of the replacement device contained in the replacement device profile is similar to a characteristic of the device contained in the usage device profile.

In accordance with this embodiment of the present invention, the device is connectable to a network, and the data collection device comprises a smart box connectable to the network, the smart box having a processor and memory having stored therein general purpose software, and having storable therein smart box special purpose software.

In accordance with this embodiment of the present invention, the step of causing the usage data to be stored comprises causing the usage data to be stored in memory of a server remote from the device.

In accordance with this embodiment of the present invention, the server has server special purpose software installed in server memory and is configured to cause a server processor to perform at least one of the steps of determining a replacement device, determining a total cost of ownership of the replacement device, comparing the total cost of ownership, and providing a recommendation for a transaction to replace the device, is carried out by the server special purpose software.

The method according to this embodiment of the present invention further comprises the step of providing a user interface for display on a user device, the user interface enabling a user of the user device to access information about the device.

The method according to this embodiment of the present invention further comprises the step of receiving a target total cost of ownership from the user via the user interface.

The method according to this embodiment of the present invention further comprises the step of collecting usage data of the device.

Another embodiment of the present invention is directed to a method for facilitating a transaction between a first user and a second user having a device having a device characteristic. The method of this embodiment comprises the steps of receiving a request from the first user to acquire or lease a device that includes a requested device characteristic, receiving an indication from the second user of a desire to replace the device, determining if the requested device characteristic is the same as or similar to the device characteristic, and providing a recommendation for a transaction between the first user and the second user to transfer the device from the second user to the first user when the requested device characteristic is the same as or similar to the device characteristic.

In accordance with this embodiment of the present invention, the device characteristic is a total cost of ownership of the device, and the requested device characteristic is a total cost of ownership of the requested device.

The method according to this embodiment of the present invention further comprises the step of providing the first user with access to a first interface via a first user device, and providing the second user with access to a second interface via a second user device.

In accordance with this embodiment of the present invention, the step of receiving a request from the first user comprises receiving a request from the first user via the first interface, and the step of receiving an indication from the second user comprises receiving an indication from the second user via the second interface.

Yet another embodiment of the present invention is directed to a system configured to recommend a transaction to replace a device based upon a total cost of ownership of the device and determined using usage data of the device, where transaction is initiated using a user electronic device that is connectable to a network. The system comprises a smart box connectable to the network (the smart box having a processor and memory having stored therein general purpose software, and having storable therein special purpose software), a server connectable to the network and having a processor and memory (the memory having stored therein server special purpose software and a device usage profile associated with the device), and a user device control installable on or accessible by the user electronic device, where the user device control enables a user of the user electronic device to initiate a transaction to replace the device. The smart box special purpose software is configured to cause a smart box processor to collect usage data of the device, and to cause the usage data of the device to be stored in the device usage profile. The server special purpose software is configured to cause a server processor to determine a replacement device based upon one of user input and the usage data of the device, determine a total cost of ownership of the replacement device based upon the usage data of the device, compare the total cost of ownership of the replacement device and the total cost of ownership of the device, and provide a recommendation for a transaction to replace the device with the replacement device when the total cost of ownership of the replacement device is less than or equal to the total cost of ownership of the device.

Aspects of the present invention introduce a paradigm shift in the way electronic devices are specified and replaced by creating a user-centric environment that provides access to usage data for any device to stakeholders other than those traditionally having such access, e.g., device manufacturer, device supplier, device installer, device service personnel, device sales rep, etc. The inventive paradigm shift is thus from a device-centric environment, with limited access to useful device usage data, to a user-centric environment, with expanded access to such data. In addition, the inventive paradigm shift further enables a stakeholder to take control of the process for replacing a device by using the now accessible usage data of the device to identify or determine a replacement device that is better suited for the actual use to which the device is put, to calculate a cost of ownership of the replacement device based upon the usage data, to compare that cost of ownership with a cost of ownership of the currently installed device, and to recommend replacing the currently installed device with the replacement device when the cost of ownership of the latter is less than the cost of ownership of the former. The benefits of the present invention may include, but are not limited to, identification, determination, selection, and installation of a device that is matched with the actual usage of that device, reduction in operating expenses due to a lower cost of ownership for installed devices, acceleration of the sales process for replacement devices, stakeholder satisfaction and confidence in device selection, and reduction in sales costs due to potential elimination of sales commissions.

Such an innovative and unconventional technological solution to the technological problem of specifying and replacing devices is not found in the prior art. Advantageously, the user-centricity created by the present invention places, in each unique user's hands, the ability to effect such control over a device in accordance with that unique user's needs or desires. And because of the ubiquity of personal user electronic devices via which the present invention may be utilized, the present invention eliminates user learning curves for new user devices, integration issues associated with adding/replacing user devices, and restrictions on available functionality from pre-configured user devices.

The innovative and unconventional technical solution provided by the present invention also provides a stakeholder (i.e., business owner, device manufacturer, device supplier, device sales rep, etc.) with greater control over replacement of a device. Certainly a business owner prefers that business equipment (e.g., MFPs, computers, fleet vehicles, warehouse machinery and equipment, etc.) be properly specified. For example, a network of printers may comprise various different types, sizes, etc. of printers to accommodate various usage needs. However, the different printers are not specified based upon actual usage data for the business, but rather on generalized assumptions about usage or other factors that may not be relevant for this particular business. The present invention provides a significant improvement over prior art methods and systems for device selection and replacement in that the present invention enables a stakeholder to collect and store usage data for each device, and to use that usage data to specify, identify, determine, select, etc. a device having features, functionality, capacity, capabilities, etc. that match the collected usage data for a particular device. Thus, embodiments of the present invention provide a stakeholder with the ability to ensure that a device is optimal for the specific device requirements based upon actual usage data. In addition, embodiments of the present invention may preferably use actual usage data to calculate TCO, resulting in a more accurate TCO calculation, as well as one that reflects the ownership cost of a device based upon actual usage data.

Not only does the present invention use a conventional device in an unconventional way, embodiments of the present invention are tied to a specific structure, connection and arrangement of components, purposefully structured, connected and arranged to achieve an inventive technological solution to a technological problem specific to electronic devices and systems—the inability of a user to control the replacement based upon actual usage data and based upon total cost of ownership comparisons that are also based upon actual usage data. The result is optimization of device selection, deployment and use because it is now based upon collected and analyzed actual usage data. Whereas the prior art, representing a device-centric environment, device usage data is typically used by a manufacture to monitor contract compliance and/or schedule maintenance, the present invention creates an environment that enables stakeholder access to usage data that can be used on the one hand by the device owner (or lessee) to evaluate device utilization, and on the other hand by the manufacture of the device (or a competitor of that manufacturer) to recommend a replacement device better suited and matched to the actual usage. In addition to who accesses usage data, how that data is accessed is also improved by the present invention. Specifically, the present invention enables and facilitates access to device usage data, in an embodiment, with a user electronic device at an edge of a network within which the devices are being used—one such network edge being defined from the perspective of each unique user's electronic device looking inward into the network.

In accordance with embodiments of the present invention, a number of advantages can be realized. By recognizing that personal electronic devices are ubiquitous, and by further recognizing that for each such device, the user interface and use of the device can be considered universal, i.e., it is the same for each device within a category of devices, the present invention provides universality in its solution to the problems with the prior art discussed above. More specifically, the present invention advantageously recognizes that a user of a smartphone, for example, does not encounter a learning curve when additional features are added to the smartphone, or when the smartphone is used in a new way, as with the present invention. Rather, the introduction of new features and functionality to the user via the user's smartphone is relatively seamless. Thus, the present invention enables a user to change the function and/or functionality of a target electronic device without having to learn how to use that device to perform the new/changed function.

The present invention also advantageously provides universality across controllable electronic devices. Regardless of the type of device, or of the manufacturer of a device type (e.g., HP, Dell, Canon, etc. for MFPs) to be accessed and controlled, the present invention enables a user electronic device to access and control an electronic device by separating the user interface from the target electronic device and placing it with the user on a platform with which the user is familiar. The present invention thus makes its technology frictionless, as the user need not care or know about the type of electronic device being accessed or controlled to realize the advantages of the present invention.

The present invention also advantageously extends a periphery about an electronic device from in-fact proximity to the device, to a smart box connectable to the electronic device over a network, and to a user electronic device. In so doing, the present invention not only places access to and control over electronic devices to which the user desires to connect or interact in the user's hand, the present invention further makes such access and control user-centric. Thus the present invention introduces a paradigm shift from a device-centric world to a user-centric world with respect to accessing and controlling electronic devices in a way that enables the user to collect and store usage data for each device, and to use that usage data to specify, identify, determine, select, etc. a device having features, functionality, capacity, capabilities, etc. that match the collected usage data for a particular device. Thus, embodiments of the present invention provide a stakeholder with the ability to ensure that a device is optimal for the specific device requirements based upon actual usage data. In addition, embodiments of the present invention use actual usage data to calculate TCO, resulting in a more accurate TCO calculation, as well as one that reflects the ownership cost of a device based upon actual usage data. Prior to the present invention, device replacement was straight-forward, initiated reactively by the owner/lessee or seller (i.e., sales rep), and considered only certain aspects about the device and its use—generally, specifications considered by the owner/lessee as compared with perceived usage requirements, and costs. What was missing was a consideration of actual usage data as a measure of actual device usage, the total cost of ownership of the device based upon actual usage data, and recommendation of a replacement device based upon the foregoing.

BRIEF DESCRIPTION OF THE DRAWINGS

Embodiments of the present invention will now be described with reference to the following figures, wherein:

FIGS. 10A-10J depict screen shots and interfaces of a CPQ tool in accordance with embodiments of the present invention.

DETAILED DESCRIPTION

The following describes exemplary embodiments of the present invention. It should be apparent to those skilled in the art from the disclosure provided herein that the described embodiments of the present invention are illustrative and not limiting, having been presented by way of example only. All features disclosed in this description may be replaced by alternative features serving the same or similar purpose, unless expressly stated otherwise. Therefore, numerous and various other embodiments are contemplated as falling within the scope and spirit of the present invention.

As used herein, the term "device" is used to describe anything that is replaceable. In preferred embodiments, a device is an electronic device that may be a singular electronic device, or one or more electronic devices connected or connectable via any means that can communicate with each other. This term is further used in an expansive way, intended to encompass any type of known or hereafter developed device usable in connection with, or suitable for carrying out all or part of, the present invention. In alternative embodiments, a device may be any device, system or apparatus that is replaced with some regularity and frequency. This includes, by way of non-limiting example, any type of business, industrial, commercial, residential, consumer, individual, or personal device, system or apparatus. In still other embodiments, the present invention is directed to services of any type that may be evaluated with some regularity and frequency.

As used herein, the phrase "personal electronic device" or "user electronic device" means, by way of illustration and not limitation, smartphones, tablets, mobile computers, desk-top computers, mobile Internet devices, laptops, wearable computers, calculator watches, smartwatches, head-mounted displays, personal digital assistants, enterprise digital assistants, handheld game consoles, portable media players, calculators, digital still cameras, digital video cameras, personal navigation devices, and smart cards, or any other known or hereafter developed personal electronic device.

As used herein, the phrase "device transaction(s)" means any instruction, command, request, order, etc. provided by a user to access, manipulate, control, or otherwise interact with an electronic device.

Figure 1:
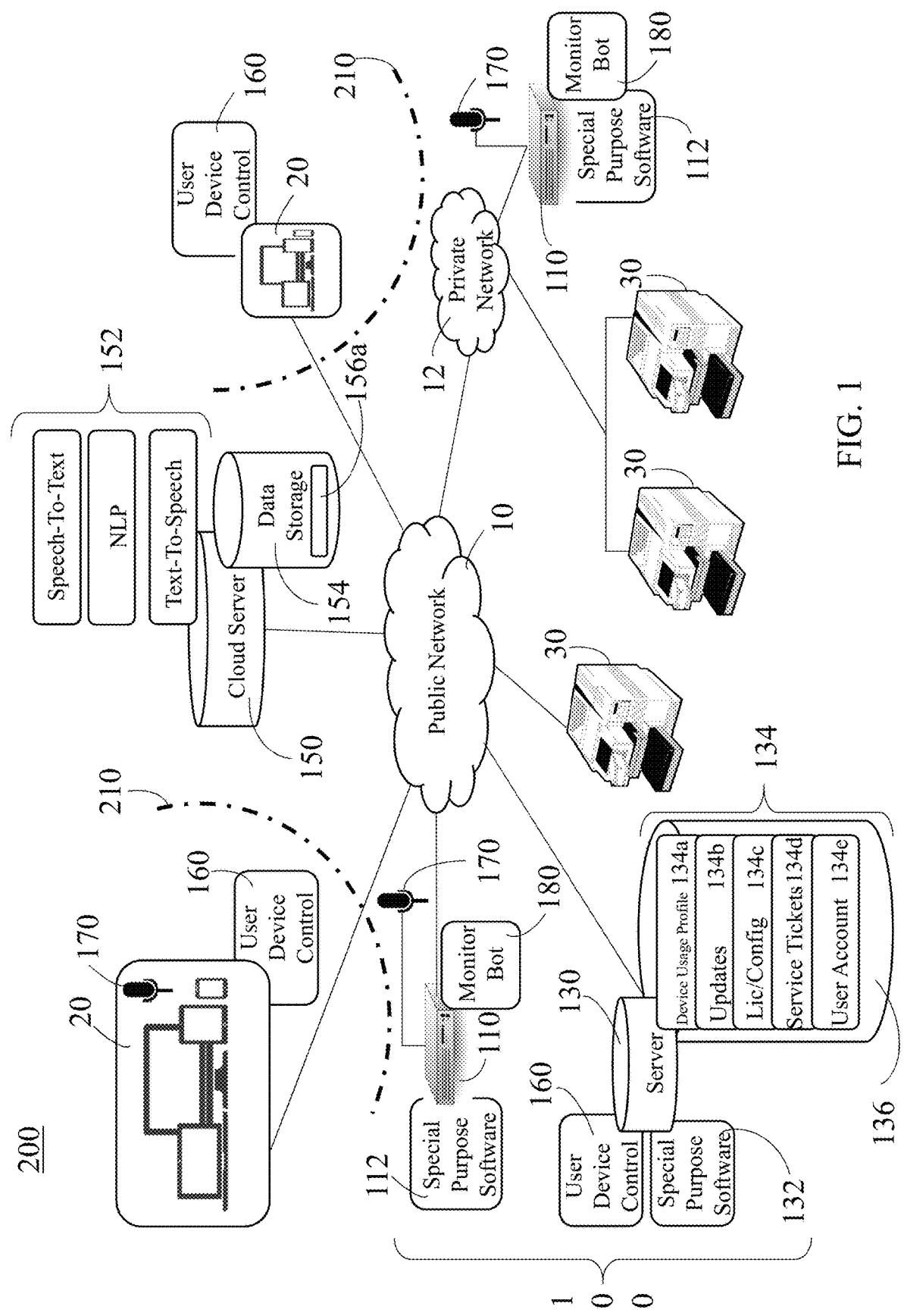
FIG. 1 is a schematic diagram of a system and network architecture in accordance with embodiments of the present invention.
Figure 2:
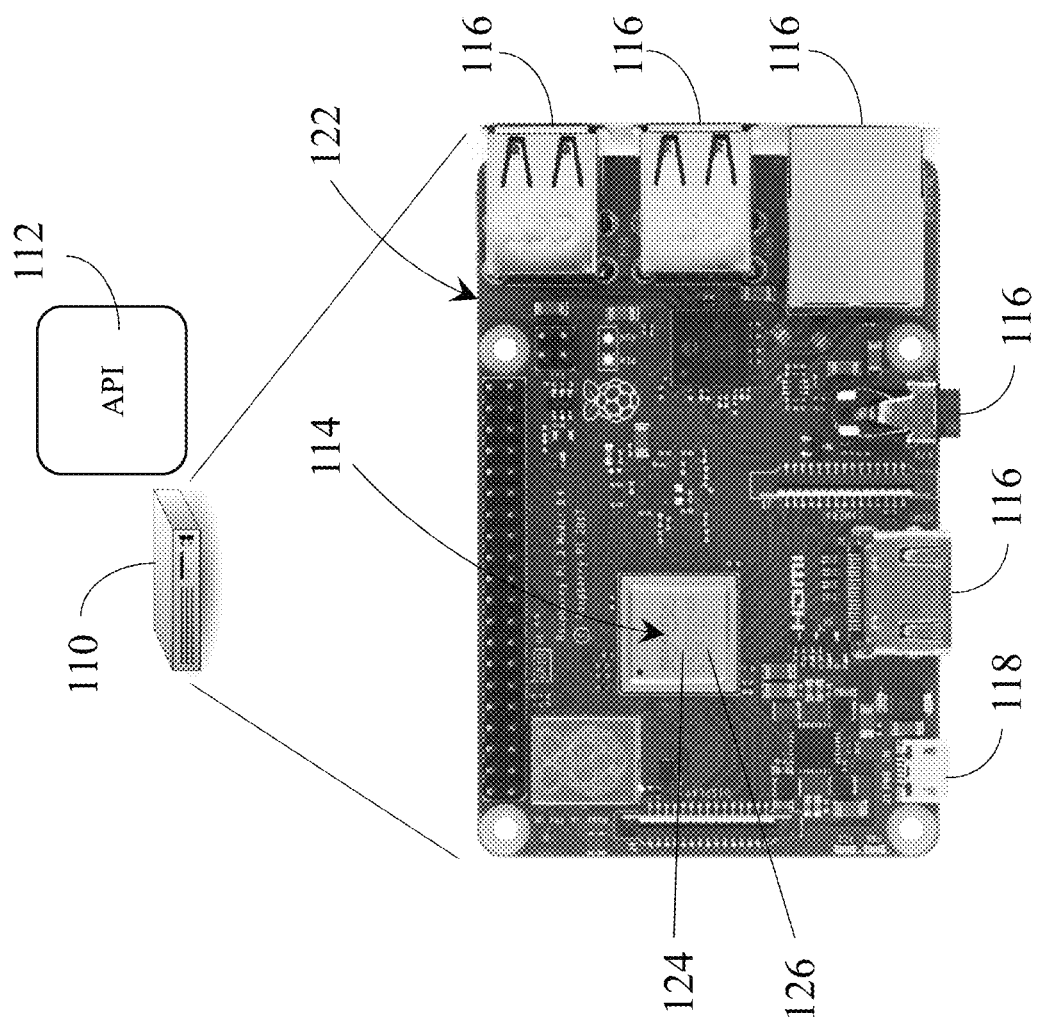
FIG. 2 depicts a single board computer of a smart box in accordance with embodiments of the present invention.
Figure 3:
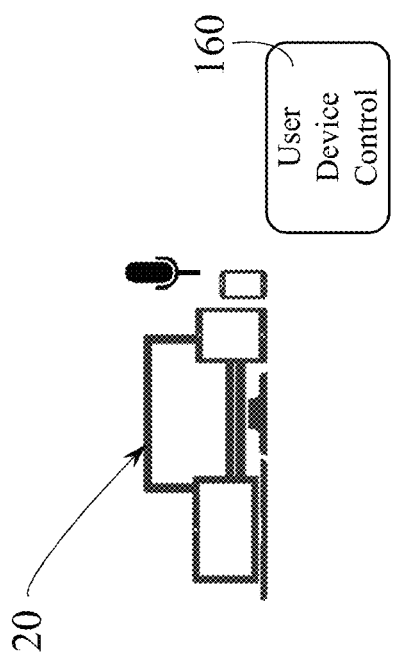
FIG. 3 depicts the structure and function of a user device control in accordance with embodiments of the present invention.

Referring next to the drawings in detail, FIGS. 1 and 2 respectively depict a schematic diagram of a system 100 and network architecture 200, and a single board computer 122 of a smart box 110 in accordance with embodiments of the present invention. The system 100 comprises a smart box 110 having smart box special purpose software 112 storable in memory 126 comprising commands or instructions that, when executed by a processor 124 cause the processor to carry out aspects of the present invention. In a preferred embodiment, the special purpose software 112 may be an API with programmable functionality. The system 100 further comprises a server 130 having special purpose software 132 comprising commands or instructions that, when executed by a server processor cause the server processor to carry out aspects of the present invention. The system 100 may comprise one or more smart boxes 110, with the smart box(es) 110 and server 130 preferably not co-located.

The smart box 110 is connectable to one or more devices 30 directly, via a private network 12, and/or via a public network 10. Preferably, the smart box 110 and devices 30 are part of and/or connectable to a private network 12. The server 130 may be provided in the private network 12, or in the public network 10. Alternatively, the smart box 110 may be part of and/or connectable to the public network 10, yet connectable to another smart box 110 or device 30 that are both part of a private network 12.

A user device control 160 is installable on a user electronic device 20 that is connected or connectable to a private network 12 or a public network 10, and that is in communication with devices 30 through one or more smart boxes 110. The user device control 160 is downloadable to the user device 20 from the server 130 and/or from another server. Embodiments of the present invention provide the user device control 160 at an edge 210 of the network, thus placing the ability to control the function or functionality of an electronic device in the hands of users at the network edge 210.

The server 130 may be implemented, by way of non-limiting example, at least in part based on the machine learning platform provided by AMAZON WEB SERVICES (AWS) cloud computing and storage services. The server 130 carries out certain administrative functions of the present invention. For example, the server 130 communicates initially with a smart box 110 when the smart box 110 first connects to the network and comes on line. In this capacity, licensing and configuration data 134c previously saved as a data file 134 in server data storage 136 is communicated to the smart box 110 and usable by the smart box 110 for its initial configuration. Further configuration of the smart box 110 may be required and performed by an administrator, as described in more detail herein. The server 130 also communicates software updates to a smart box 110 as necessary, which are stored as an update data file 134b. This communication occurs automatically and is managed by a scheduler on one or both of the server 130 and smart box 110. The server 130 is also a repository for usage data and statistics for the devices 30 in the network 10, 12. The data and statistics are acquired from each device 30 by the smart box 110, and communicated thereby to the server 130, where the data and statistics are stored as usage data in a device usage profile 134a for each device. A separate device usage profile 134a is created for each device 30, and that file can be used to intelligently use and manage the device 30. The device usage profile 134 of each device may also contain one or more characteristics of the device such as, by way of non-limiting example, device manufacturer, model number, print/copy/fax capacity, purchase cost, maintenance cost, and various other information about the device, as would be obvious to a person skilled in the art from the disclosure provided herein. The server 130 also communicates initially with a user electronic device 20 through the user device control 160 to create an account for and authenticate the user, and to bring the user electronic device 20 online.

Figure 6:
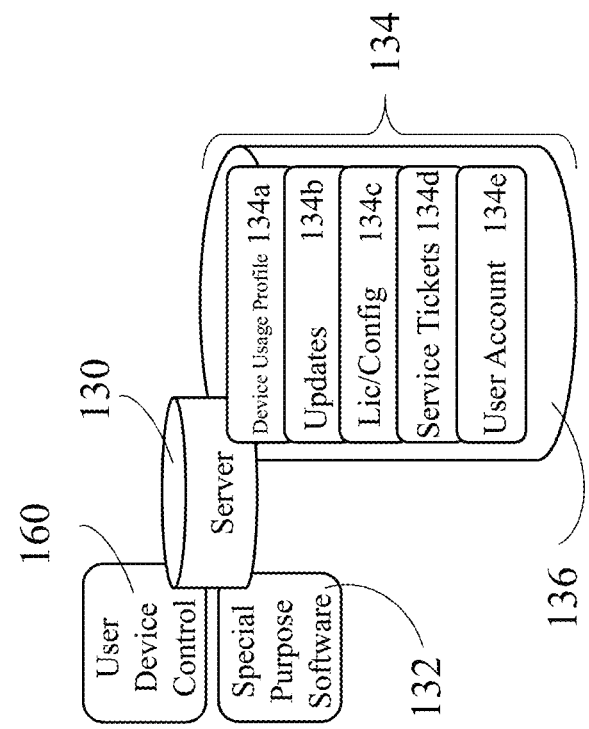
FIG. 6 depicts the structure and function of special purpose software of a server in accordance with embodiments of the present invention.

The server 130 has a processor and memory having stored therein general purpose software comprising commands or instructions executable by the server processor for carrying out basic functions of the server 130, and special purpose software 132 comprising commands or instructions executable by the server processor for carrying out aspects of the present invention. This configuration is also illustrated by FIG. 6. For example, the server special purpose software 132 may perform one or more of the inventive steps of determining a replacement device based upon the usage data of the device, determining a total cost of ownership of the replacement device based upon the usage data of the device, comparing the total cost of ownership of the replacement device and the total cost of ownership of the device, and providing a recommendation for a transaction to replace the device with the replacement device when the total cost of ownership of the replacement device is less than or equal to the total cost of ownership of the device. In an alternative embodiment, where a target total cost of ownership savings value is defined, the server special purpose software 132 may perform one or more of the inventive steps of determining a replacement device based upon the usage data of the device, determining a total cost of ownership of the replacement device based upon the usage data of the device, comparing the total cost of ownership of the replacement device and the total cost of ownership of the device, and providing a recommendation for a transaction to replace the device with the replacement device when difference between the total cost of ownership of the replacement device and the total cost of ownership of the device is greater than or equal to the total cost of ownership savings value. The just-described functionality of the server special purpose software 132 may be carried out by software installed and operational on the service 130, or on another similar computing device or system.

The server 130 data storage 136 may be part of or separate from the server 130. A data file 134 is created for each device 30 in the data storage 136 as one or more files or databases. Exemplary types or categories of files or databases created as a data file 134 are depicted in FIGS. 1 and 6 and comprise data relating to electronic devices 30 such as usage data in the form of a device usage profile, updates and service tickets, and data relating to a user and the smart box 110 and user device control 160 such as licensing and configuration. For example, device usage profile 134a for a multi-function printer, for example, may comprise, by way of non-limiting example, usage data about the number and/or volume of print jobs, copy, job, fax jobs, and/or email jobs carried out by the device 30. Such usage data may also comprise day, date, and time of usage, idle time(s), data regarding the MFP component usage, e.g., which paper tray, print cartridges, etc. Such usage data is capturable by the smart box 110, and may be transmitted thereby to the server 130 at predetermined times. Such usage data may currently be gathered and computed internally by the MFP, for example, but may be accessible only by the manufacturer or authorized service personnel of the MFP. In addition, such usage data are typically used to confirm compliance with device lease agreements and/or to schedule regular maintenance. Embodiments of the present invention capture that data and transmit it to the server 130 for storage and later use by others, such as, business owners, network designer, administrators, etc. responsible for the selection, deployment, payment and usage of devices 30 such as MFPs. Data files 134 may also comprise update data 134b for updates for one or more devices 30 that are transmittable, downloadable, etc., from the server 130 to the device 30. Updates may include, by way of non-limiting example, updates for general operation and function of the smart box 110, and updates for operation and function of inventive aspects of the smart box 110. Data files 134 may further comprise licensing and configuration data 134c that is unique for, and specific to a particular smart box 110. Licensing and configuration data 134*c* generally comprises information provided by an administrator of a smart box 110, for example, that is used to define certain operational parameters for the smart box 110, as well as data provided by the server 130. For example, licensing and configuration data 134*c* for a company may include the format of a user's email, the number of users, the number of electronic devices 30, identifiers for each device 30 (e.g., IP address), codes specific to the company and/or a group or department within the company, an API key unique to each smart box 110 that comprises a license ID and machine key, essentially a user name and password for the smart box 110, and other data and information that serve to define connection and communication rules between a smart box 110, the server 130, a user electronic device 20, and one or more devices 30.

Data files 134 may also comprise service ticket data 134*d* collected by the smart box 110 from the devices 30 with which it communicates. Service ticket data 134*d* may be generated by a user or by a device 30, indicative of a state of the device 30 that may require intervention, e.g., paper jam, toner cartridge replacement, etc.

In a preferred embodiment of the present invention, the server special purpose software 132 may comprise an application programming interface, or API, that functions as a REST-based API endpoint for communication with the smart box 110 and/or user electronic device 20. Communication between and among the various electronic devices may use java script object notation. The API special purpose software 132 is structured based upon sub-components that provide microservices within the API that may include, by way of non-limiting example, storing data received from a smart box 110 about one or more devices 30, providing updates to a smart box 110, routing service ticket requests, and other selectively programmable microservices that may facilitate communication between and among smart boxes 110, user electronic devices 20, devices 30, and other devices and systems, either in the private network 12, the public network 10, or a combination of both. For example, the server special purpose software 132 may perform one or more of the inventive steps of determining a replacement device based upon the usage data of the device, determining a total cost of ownership of the replacement device based upon the usage data of the device, comparing the total cost of ownership of the replacement device and the total cost of ownership of the device, and providing a recommendation for a transaction to replace the device with the replacement device when the total cost of ownership of the replacement device is less than or equal to the total cost of ownership of the device. In an alternative embodiment, where a target total cost of ownership savings value is defined, the server special purpose software 132 may perform one or more of the inventive steps of determining a replacement device based upon the usage data of the device, determining a total cost of ownership of the replacement device based upon the usage data of the device, comparing the total cost of ownership of the replacement device and the total cost of ownership of the device, and providing a recommendation for a transaction to replace the device with the replacement device when difference between the total cost of ownership of the replacement device and the total cost of ownership of the device is greater than or equal to the total cost of ownership savings value. The special purpose software 132 may additionally comprise a user device control 160 uploadable to a user device 20 that provides a user interface 700 (see, e.g., FIG. 7A), a configure—price—quote ("CPQ") tool (see, e.g., FIGS. 10A-10J), and other functionality described herein in accordance with embodiments of the present invention. While in a preferred embodiment the user device control 160 is an application downloadable by/to a user electronic device from an app store, an alternative embodiment provides the user device control 160 downloadable from the server 30. Another alternative embodiment of the present invention provides the functionality of the user device control 160 via a cloud-based application.

The smart box 110 generally functions as a universal controller that manages and controls communication by, between and among the various devices that comprise the present invention, as well as the various devices and documents with which the present invention accesses, manipulates, and/or controls. Communication by the user device 20 via the user device control 160 is received by or at least passes through the smart box 110. The smart box 110 is thus able to, and does in fact, capture much of the data and information created by use of the present invention, including data created by devices 30. The smart box 110 also functions as a sentry to ensure secure device transactions with electronic devices and electronic documents, and to further provide a means to collect and store usage data for one or more devices 30. The special purpose software 112 of the smart box 110 functions to provide an API endpoint for the user device control 160. The smart box 110 also controls all user access to and control of devices 30.

With more specific reference to FIG. 2, the smart box 110 preferably comprises a single board computer 122 having a central processing unit 114 comprising a processor 124 and memory 126 having stored therein general purpose software comprising commands or instructions executable by the processor to carry out basic functions of the smart box 110. For example, basic functions of the smart box 110 enable the smart box 110 to power up and communicate and control communication over a variety of interfaces 116, such as USB, Ethernet, video, audio, and HDMI. Each smart box 110 may preferably be configured with dual Ethernet ports in order to communicate with each of an Ethernet-based private local area network 12 and a device 30. Each smart box 110 may employ its Ethernet interface to monitor communications of its associated electronic devices 30 via the private network 12, provide instructions to be executed by the device 30, and retrieve data from the device 30.

An exemplary single board computer 122 is available from the Raspberry Pi Foundation, model number Raspberry Pi 3 Model B+. This model is a credit card-sized computer powered by a Broadcom BCM2835 central processing unit (system-on-a-chip) 114 that includes a 32-bit ARM 1176JZFS processor 124, clocked at 700 MHz, a Videocore IV Graphics Processing Unit, and 256 MB of random access memory 126. The single board computer 122 is powered by a 5V AC charger connectable to a micro USB port 118. It will be obvious to persons skilled in the art and from the disclosure provided herein that other single board computers may be alternatively or additionally used in connection with the present invention.

The smart box 110 further comprises special purpose software 112 storable in memory 126 comprising commands or instructions executable by the processor 124 that enables the smart box 110 to carry out certain aspects of the present invention. In a preferred embodiment, the special purpose software 112 is an API with programmable functionality. The API special purpose software 112 is structured based upon sub-components that provide microservices within the API that may include, by way of non-limiting example, device data collection, device data transmission (e.g., to a server), copy, email, collect, and service, as well as other selectively programmable functionality. Any of the foregoing may be enhanced by voice-enabled or two-factor biometric authentication aspects of embodiments of the present invention. Each microservice may operate to call a unique API path for the desired functionality—the path being to at least one of the smart box 110 and server 130. The special purpose software 112 is selectively programmable and adaptable to change/add/delete one or more functions it provides. The special purpose software 112 is also configured to collect usage data for each device 30 with which a smart box 110 is connected, communicating, etc., and to cause the usage data to be stored at a location remote from the device 30, e.g., in memory of the server 130 or another server 150 such as an AWS Web Server. This aspect of the present invention is in contrast to, and is an improvement of the prior art, in which usage data is stored in resident memory of the device 30, and/or communicated over a restricted and dedicated channel to only the device manufacturer or its authorized representative. In accordance with embodiments of the present invention, device usage data may now be accessible and usable by a larger universe of stakeholders.

Figure 4:
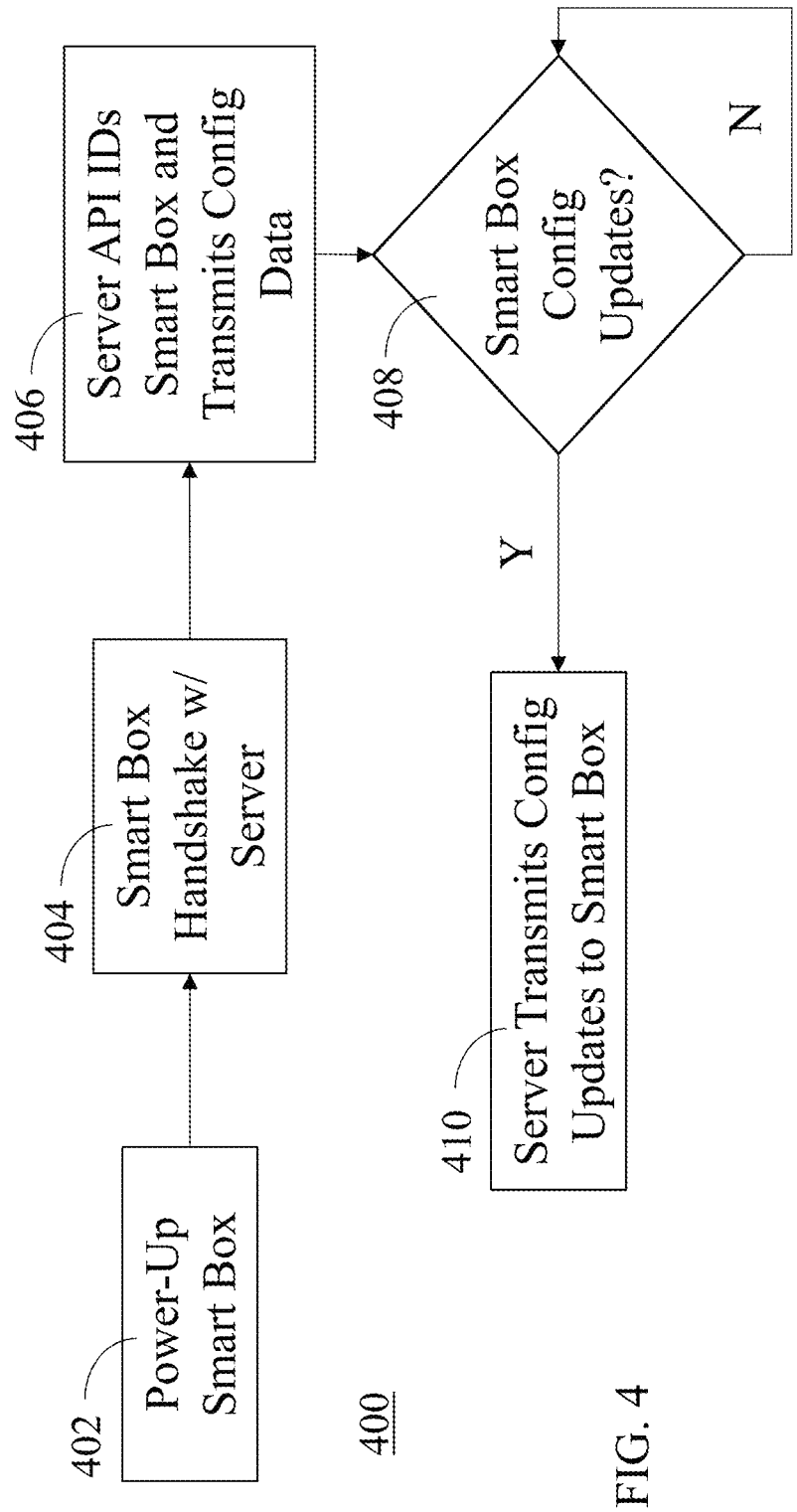
FIG. 4 is a flow diagram of a smart box start-up and configuration process in accordance with embodiments of the present invention.

A process 400 for initial configuration of the smart box 110 is depicted in FIG. 4. As an initial step, for example, a smart box 110 is pre-programmed with an API key comprised of a license ID and machine key, each unique to the smart box 110 and that together function as a user name (license ID) and password (machine key). Prior to a smart box 110 first use, it is programmed with certain data and information to enable it to connect to a server 130 upon power-up and to effect a handshake between the server 130 and smart box 110. The smart box 110 initially cycles through a start-up sequence or process when power is first applied at step 402. The general purpose software of the smart box 110 establishes a connection over the network 10 or private network 12 to the server 130 at step 404 and transmits the API key to the server 130—communicating with the server API 132. The server API 132 is configured to detect and identify the smart box 110, and to transmit configuration data to the smart box 110, at step 406. The configuration data was previously constructed as licensing and configuration data 134c stored in data storage 134 of the server 130 based upon information provided by a systems administrator, for example. Configuration of the smart box 110 is controlled by the API special purpose software 112, and is set by the licensing and configuration data file 134c. Once the licensing and data configuration file 134c is installed on the smart box 110, the smart box 110 is operational and ready to connect with devices 30 and carry out aspects of the present invention.

Configuration updates for the smart box 110 may be transmitted by the server 130 at step 410 as update data 134b if updates are available, as determined by the server 130 at step 408. The server 130 and/or smart box 110 may be configured to transmit/receive regular software updates. At least one of the server API 132 and smart box API 112 ensures that the updates are intelligently communicated, ensuring that updates to the smart box 110 do not bypass sequential updates, i.e., preventing an update from version 1.1 to version 1.9, where intermediate versions contain important updates that may or may not be included in the most recent update.

Figure 5:
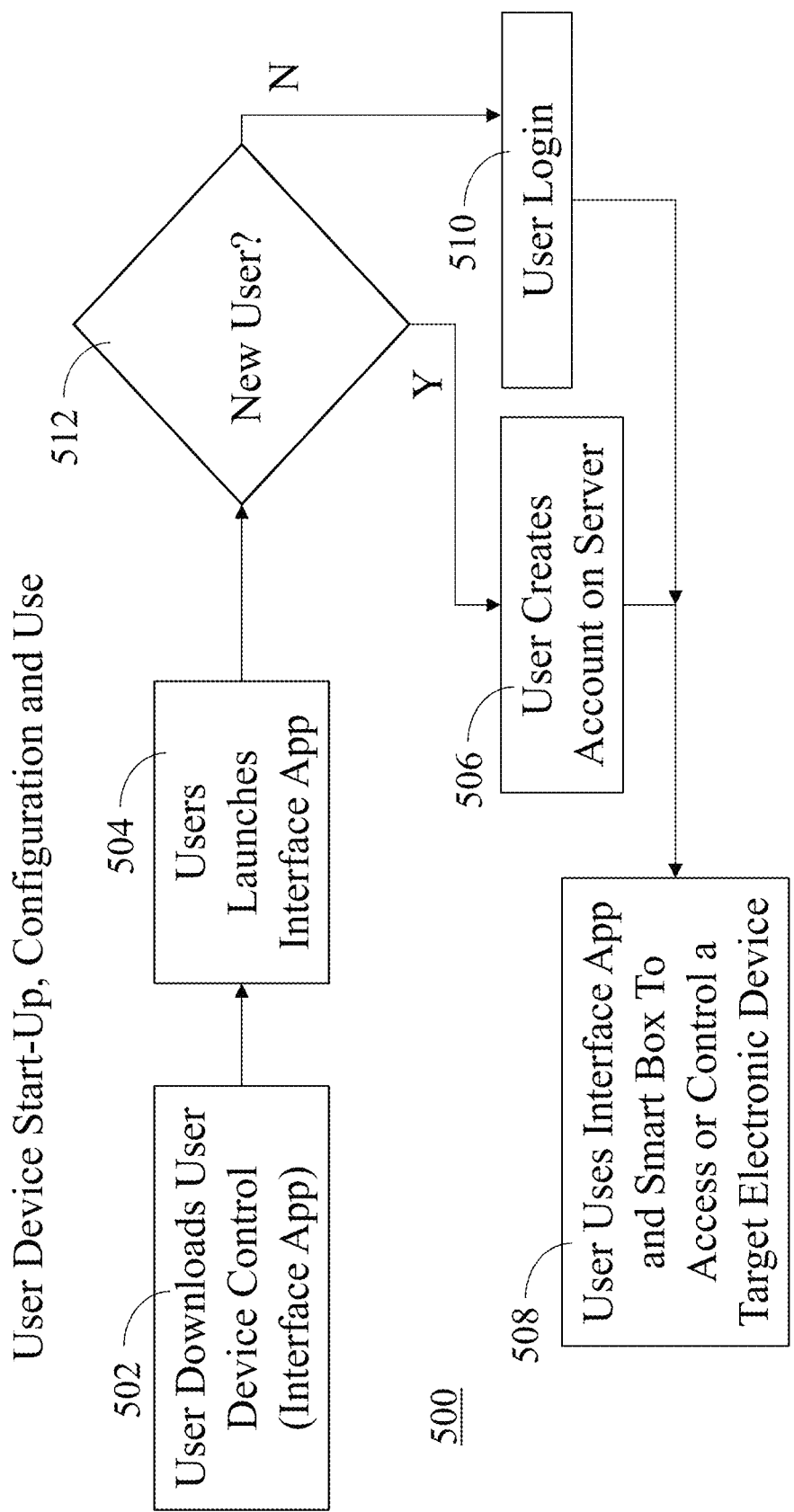
FIG. 5 is a flow diagram of a user electronic device start-up, configuration and use process in accordance with embodiments of the present invention.

The user device 20 may be any electronic device capable of carrying out aspects of the present invention as disclosed herein. Preferred embodiments include, by way of non-limiting example, a smartphone, tablet or laptop. Other electronic devices 20 are also disclosed herein, and are thus contemplated by, and within the scope and spirit of the present invention, as are any hereafter developed electronic devices capable of carrying out aspects of the present invention as disclosed herein. A user desiring to utilize the present invention installs the user device control 160 on a user electronic device 20. The user device control 160 is preferably an app downloadable to the user electronic device 20 from an app store or from the server 130. Alternatively, the user device control 160 may be a cloud-based application accessible by a user. Once the app is installed or accessed the user can launch the user device control 160 to utilize aspects of the present invention. Initially, a user must configure his/her user device 20 to carry out aspects of the present invention. With reference to FIG. 5, a startup and configuration process 500 for a user electronic device 20 is depicted. The user first downloads the user device control 160 from an app store or from the server 130 to the user device 20, at step 502, and launches the user device control 160 at step 504. When run, the user device control 160 provides a plurality of user interfaces that enable the user to utilize aspects of the present invention. The user device control 160 determines if the user is a new user at step 512, in which case the user can create an account on the server 130, step 506, and thereafter use the user device control 160, smart box 110 and server 130 to access and control a device 30 in accordance with embodiments of the present invention. Returning users, as detected at step 512, can login at step 510 and thereafter use the user device control 160, smart box 110 and server 130 to access and control a device 30 in accordance with embodiments of the present invention. As depicted in FIGS. 7A-7J, the user device control 160 provides a user interface and carries out certain inventive aspects of the present invention.

When launched, the user device control 160 provides a user interface 700 on a display of the user electronic device via which the user can utilize aspects of the present invention. The user interface 700 comprises a plurality of screens, as depicted in FIGS. 7A-7J, each of which provide a user with access to aspects of the present invention. When launched, the user device control 160 provides the user interface 700A depicted in FIG. 7A as a home screen via which a user can either select login (returning user) 702 or register (first-time user) 704. A first-time user must select register 704, and will then be prompted to enter a unique Company Code 706 via the user interface 700B depicted in FIG. 7B. That information is transmitted to the server 130, which creates an account for the user if the information entered by the user matches information in the licensing and configuration data 134c. To validate the new user the server 130 transmits an email with a temporary PIN to the user email address, which queries the user to verify the mail by return response that includes the temporary PIN and the permanent PIN. If the email address, temporary PIN and permanent PIN match data on the serve 130, the new user account is validated. Alternatively, a company my permit self-validation by empowering the administrator to indicate which of the users attempting to register are authorized users. If this is enabled, an administrator will have access to a list of users attempting to register, and can indicate (by check-box, for example) which users are authorized—this exchange occurring between the server 130 and administrator, with the information regarding validated users being captured and stored by the server 130.

Figure 7A:
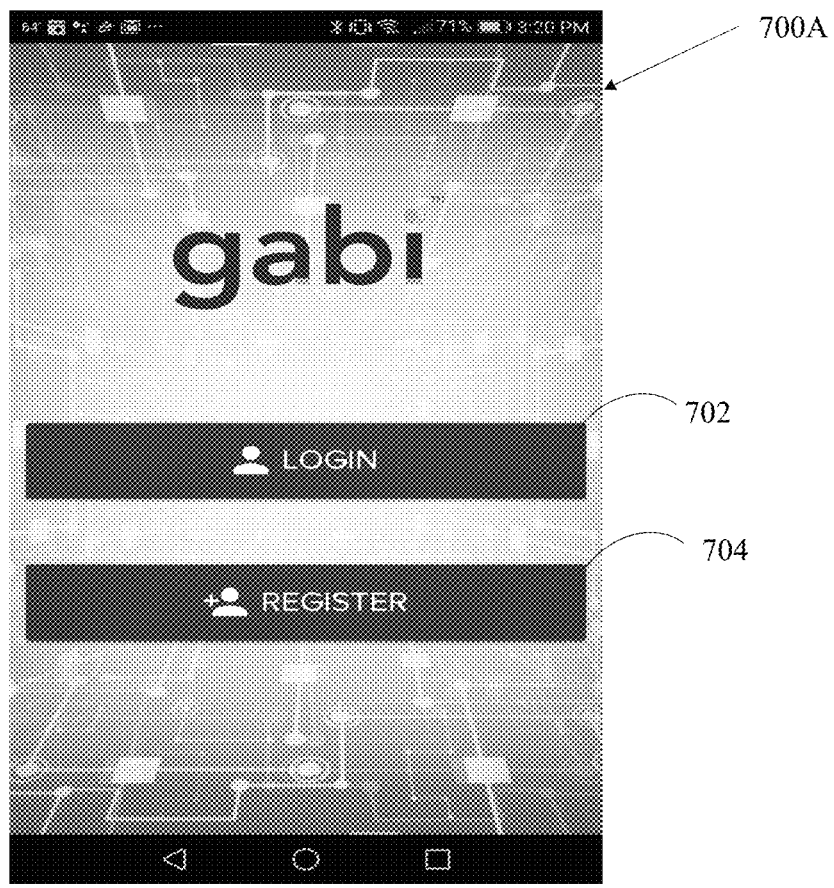
FIGS. 7A-7J depict screen shots of interfaces provided by a user device control on a user device in accordance with embodiments of the present invention.
Figure 7B:
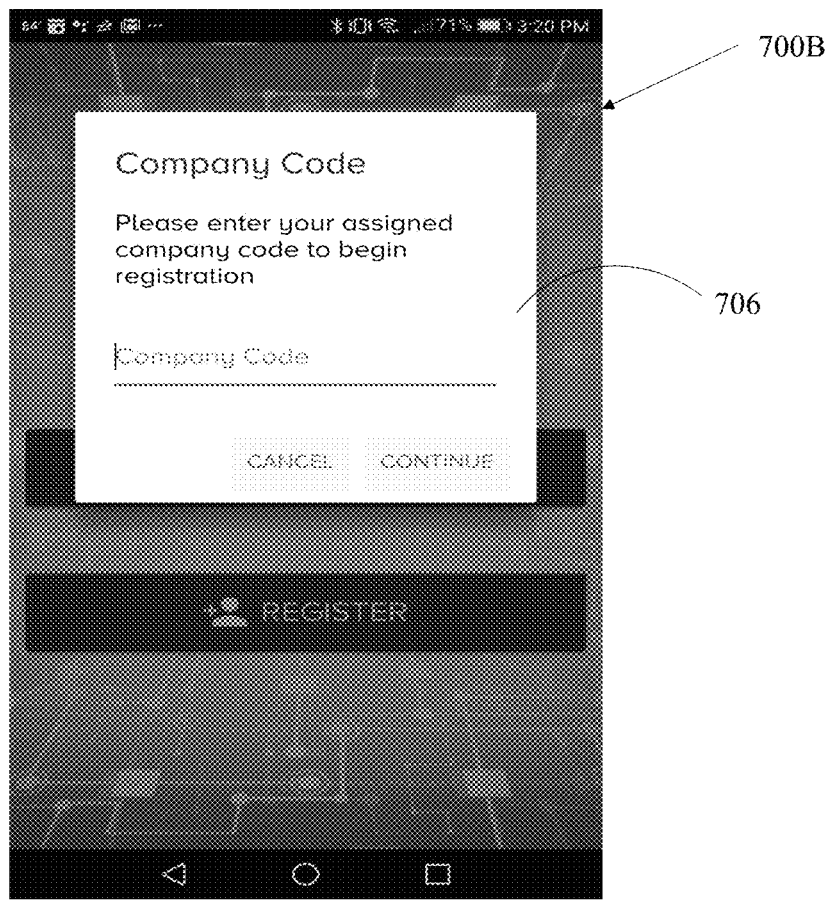
Figure 7C:
Figure 7D:

Returning users who select Login 702 on the user interface 700A of FIG. 7A are next presented with the user interface 700C depicted in FIG. 7C, and prompted to enter an email address 708 and PIN 710. Once logged in, a user will be prompted as depicted in FIG. 7D as to whether that user is proximate the device 30, in which case the user interface 700D presents a prompt 712 to the user. The user's login name and permanent PIN were previously stored on the user electronic device 20 in a secure memory location only accessible with biometric information from the user, e.g., a fingerprint read by the user electronic device 20. The present invention prevents unauthorized access to the device 30 or other aspects of the present invention without biometric authentication, when that functionality is not native to the device 30.

Figure 7E:
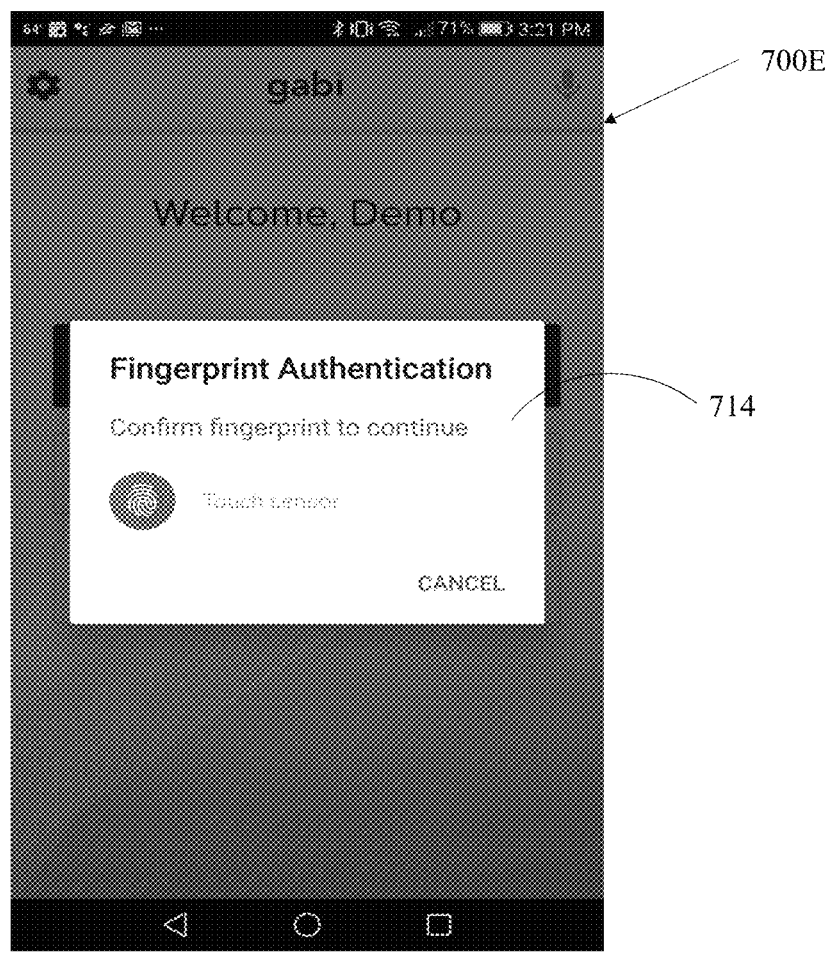

Two-factor, biometric authentication may be selectively required by, for example, fingerprint authentication 714, in which case the user interface 700E depicted in FIG. 7E will be provided by the user device control 160. This aspect of the present invention leverages certain functionality native to the user electronic device 20 that may not be native to the device 30 to cause that device 30 to carry-out or utilize the user electronic device 20 native functionality. In this case, the user electronic device 20 is capable of carrying out two-factor authentication using biometric data as one factor, and embodiments of the present invention enable that function to be used in connection with the device 30. As depicted in FIG. 7E, user interface 700E may prompt the user to a biometric authentication—a finger print in this example—via a touch sensor fingerprint authentication 714.

Voice recognition functionality may be provided by embodiments of the present invention through interaction between an audio interface 170 of the user electronic device 20, a separate audio interface 170 proximate a device 30, and a voice recognition server 150 such as, by way of non-limiting example, IBM WATSON. This enables a user to carry out certain aspects of the present invention using audible commands. In an embodiment of the present invention, a voice signature for the user may be stored in the user account file 134e or otherwise in memory of the server 130 or a web server 150 capable of voice recognition. The verbal command entered by the user though the user device control 160 (via the audio interface 170) is captured (at least temporarily) thereby enabling comparison of the user's voice with the voice signature for that user previously stored. A user invokes this functionality with voice command captured or received by an audio interface 170 such as a speaker/microphone on the user electronic device 20, or a stand-alone speaker/microphone, see, e.g., FIG. 1 and voice activation 760 interface of the user device control 160 in FIG. 7F. Regardless of which audio capture/reception device is used, receipt or detection of a specific wake-up word or phrase causes the voice recognition aspect of the present invention to change from an inactive or passive state, where audio is received by the audio interface 170 but no action is invoked in response thereto, to an active state, where audio is received by the audio interface 170 and causes the smart box 110 to react according to the content of the received audio. Thus, the audio interface 170 and voice recognition aspect of the present invention does not capture all audio within range of the audio interface 170, but only audio that is preceded by the specific wake-up word or phrase.

Figure 7F:
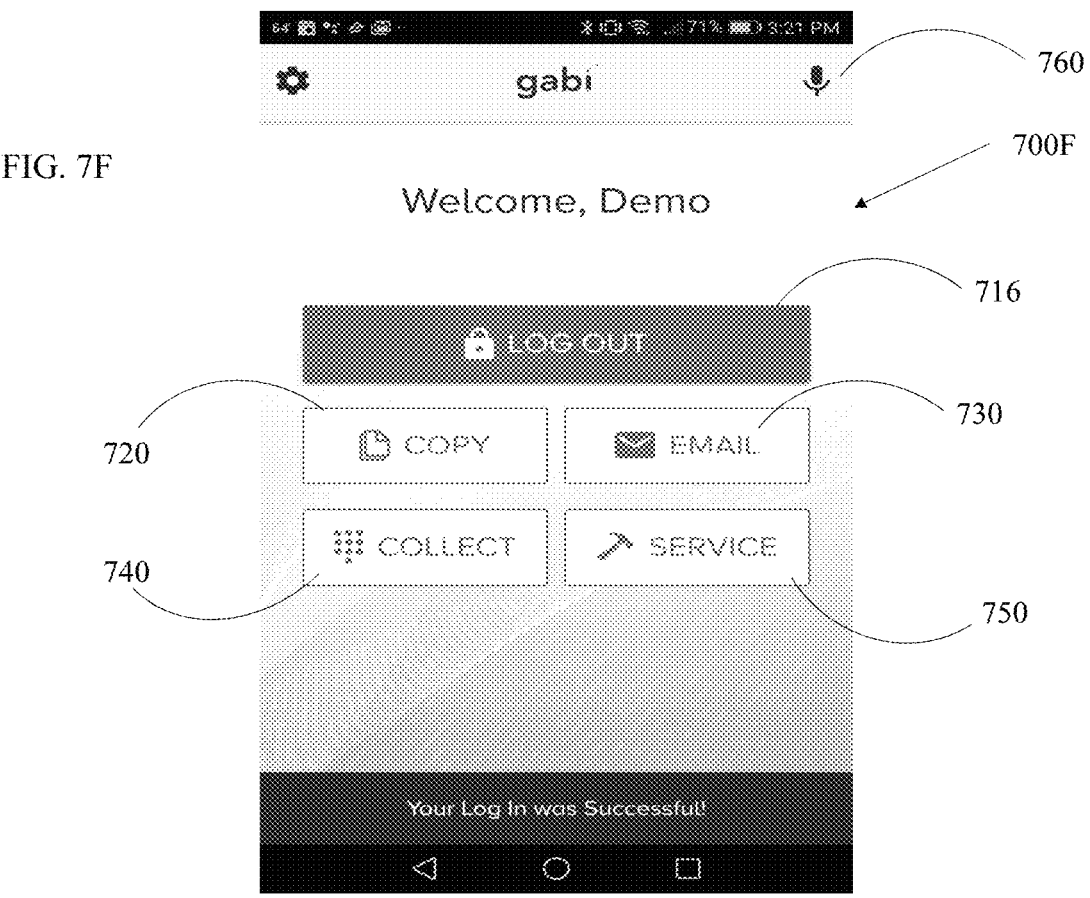

After successful authentication, the user interface 700F depicted in FIG. 7F provides the user with a plurality of functions the user may select to access and control a device 30. In one embodiment, these functions include, by way of non-limiting example, copy 720, email 730, collect 740 and service 750. The user can also use voice activation 760 to log-in or log-out 716. Each of these functions maps to API commands within the user device control 160, and to the smart box 110 which, in turn, accesses and controls a device 30 to enable that device to perform or respond to the selected function. This aspect of the present invention leverages certain functionality native to the user electronic device 20 that may not be native to the device 30 to cause that device 30 to carry-out or utilize the native functionality. In this case, the user electronic device 20 is capable of responding to audible commands, and embodiments of the present invention enable that function to be used in connection with the device 30, when that functionality is not native to the device 30.

Operation and operational aspects of the present invention will now be described, with continued reference to the drawings. The present invention is largely addable to existing private networks 12 and public networks 10 without changes to either. As an initial step, the smart box 110 is pre-programmed for use in a specific network and network configuration, and to know the credentials of devices 30 in its network. Parameters for pre-programming the smart box 110 are provided, at least in part, by a person or entity involved with the configuration, setup and operation of aspects of the present invention. For example, pre-programming parameters may include, by way of non-limiting example, IP addresses of each device 30 in the network to be accessed and controlled by the present invention. This information is saved as a licensing and configuration data 134c as a data file 134 in data storage 136 of the server 130, and is also associated with a unique company code that maps a smart box 110 to the licensing and configuration data 134c. The smart box 110 is initially programmed with an API key that includes a license ID and machine key unique to the smart box 110. When the smart box 110 is initially connected to the private or public network, 12, 10, the smart box 110 communicates the API key to the server 130 as a user name or login ID and password. The server 130 identifies the data file 134 for this smart box 110, and returns the licensing and configuration data 134c to the smart box 110. Once a smart box 110 has successfully logged into the server 130, the server 130 sends an email, text, or other communication to a destination previously identified when programming parameters were provided about the smart box 110. Typically, this would be an email address of a system administrator. In that email address a hyper-link is provided that, when selected by the administrator, connects the administrator to the smart box 110 as a console, providing the administrator with access to certain control functions for the smart box 110 and its configuration. For example, once connected as console, the administrator will have access to a pull-down menu on which each device 30 that is accessible and controllable using the present invention is identified. To enable access and control of each device 30 by the smart box 110 and user device control 160, the administrator provides super-user credentials for each device 30. This enables the smart box 110 and user device control 160 to access a device 30 as a super-user (i.e., as an administrator, service, tech, manufacturer, etc.) and gain access to data captured and stored by/on the device 30. Importantly, this includes access to usage data which can be used by the present invention.

Once the smart box 110 is brought online and the devices 30 in its network 12, 10 are accessible and controllable, the smart box 110 sits in an idle state until a user, using the user device control 160, chooses to initiate a device transaction to utilize aspects of the present invention; except that the smart box 110 automatically and repeatedly collects device usage data and causes that data to be stored at a location remote from the device 30. A user initiating a device transaction begins a process through which the device 30 changes from a closed state to an open state for this specific user. Because access to and control of a smart box 110 is user-centric, so too is control of devices 30. Thus, one user's access to and control of a smart box 110 and device 30 does not impact any other user's access and control of the same smart box 110 and device 30. If a user is denied access to a device 30, that does not impact any other user's access to the same device 30.

In the case of voice activation 760, the smart box 110 may access a voice recognition service to receive, analyze, and parse the voice commend, and to return a response to the smart box 110 that is then in a format that is transmittable to and understandable by a device 30, and that can cause or enable the device 30 to perform the requested function. Referring again to FIG. 1, a voice command spoken by a user into the user's electronic device 20 is transmitted by the user device control 160 to the smart box 110, which identifies the command as a voice command, and transits it via a secure connection to a voice recognition server 150, such as IBM WATSON or AMAZON WEB SERVICES ("AWS") platform. Communication between smart box 110 and voice recognition server 150 is preferably Transport Layer Security (TLS) 1.2. Voice recognition may alternatively be implemented in a variety of other ways, including by means of the server 130 and data storage 136 in combination with an associated smart box 110, or by another specialized server and data storage.

Special purpose software in the form of an API 152 may be provided on the voice recognition server 150, and be configured with speech to text, natural language processing ("NLP"), and text to speech capabilities. The voice recognition server 150 returns non-audio commands to the smart box 110, for transmission thereby to the device 30.

Figure 7G:
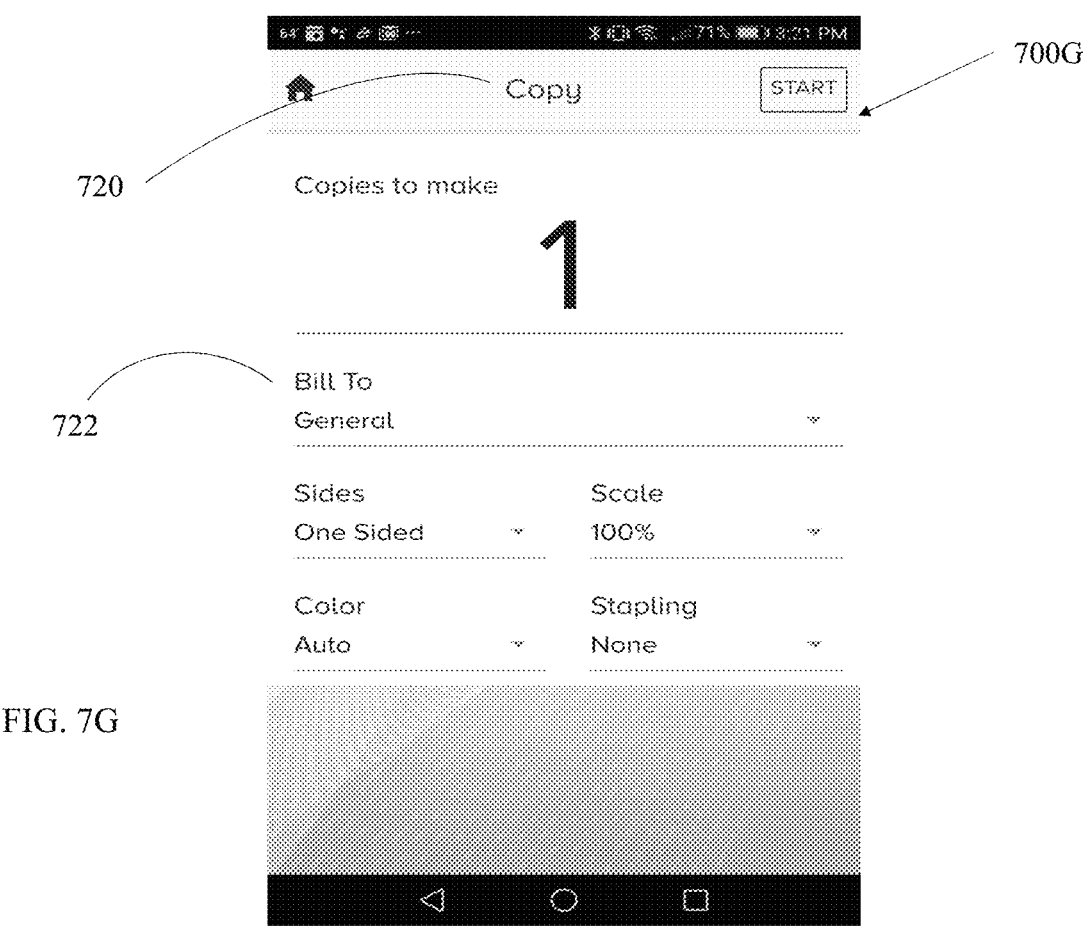

In operation, a user can access the copy function of the present invention via the user interface 700F depicted in FIG. 7F, and by selecting Copy 720, after which the user is presented with the user interface 700G depicted in FIG. 7G. Via this user interface 700G the user can control the device 30 and cause it to carry out various device transactions associated with using that device 30 for copying a document.

In operation, a user can access the email function of the present invention via the user interface 700F depicted in FIG. 7F, and by selecting Email 730. The user device control 160 then presents the user interface 700H depicted in FIG. 7H, enabling a user to use the present invention to cause a device 30, an MFP in this case, to send an email to a recipient selected by the user without access to the email list of the MFP. The present invention thus accesses data and information native to the user electronic device 20 or particular to the user, in this case, the user's email address book 736. This enables the user to cause the device 30 to send an email to a recipient that is not known to that device 30. Thus, the present invention enables a user to access and control an MFP to cause that MFP to carry out a function different than the functions it is configured to carry out. In addition, the present invention further uses native technology of the user electronic device 20 to leverage already existing connections and permissions (e.g., login details) to facilitate access to documents, services, applications, etc., for various types of user accounts. For example, a user need not enter login credentials for access to files stored in a DROPBOX account in order to access these files for use by the present invention, in effect enabling the device 30 to access these files without requiring the user's login credentials.

As a universal controller, the smart box 110 also has the ability to determine whether a user is violating a predefined rule or attempting to initiate a device transaction that would be considered an anomaly. For example, for enterprise applications, email rules may be defined regarding permitted and/or restricted email addresses. That information may be stored in a data file 134 on the server 130, in memory on the smart box 110, or both. When a user invokes the email function and attempts to email using the email user interface 700H of FIG. 7H, the smart box 110 and/or server 130 can compare the email recipient against a white-list of permitted recipients, or a black-list of restricted recipients, to determine if the email should be sent.

Figure 7H:
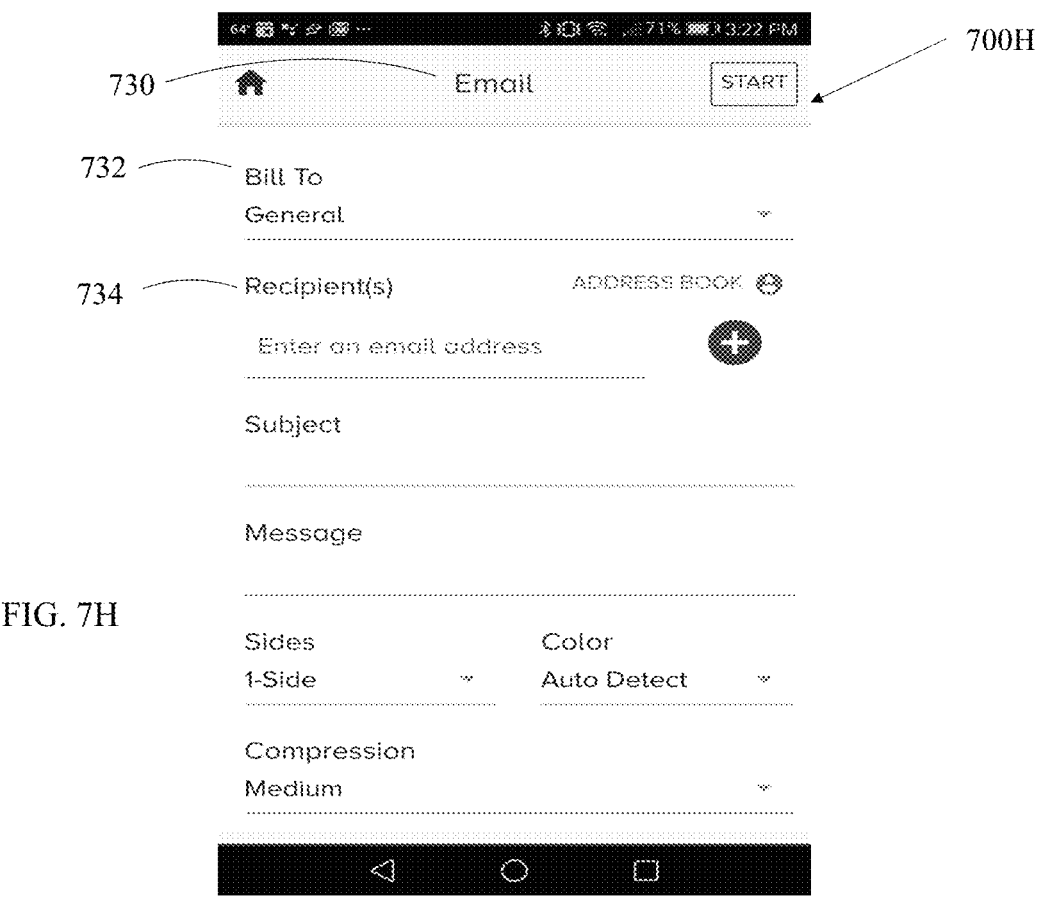
Figure 7I:
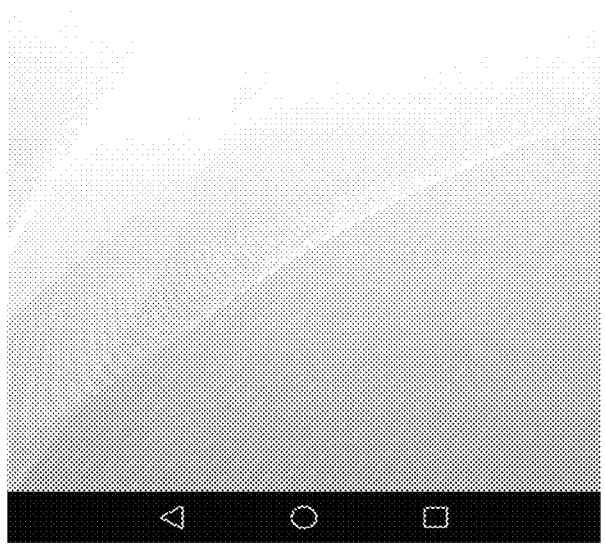

In operation, a user can access the collect function of the present invention via the user interface 700F depicted in FIG. 7F, and by selecting Collect 740, which provides user interface 700I depicted in FIG. 7I. This function enables a user to collect secure documents at the device 30, in this case the MFP, that can only be printed by the user.

Figure 7J:
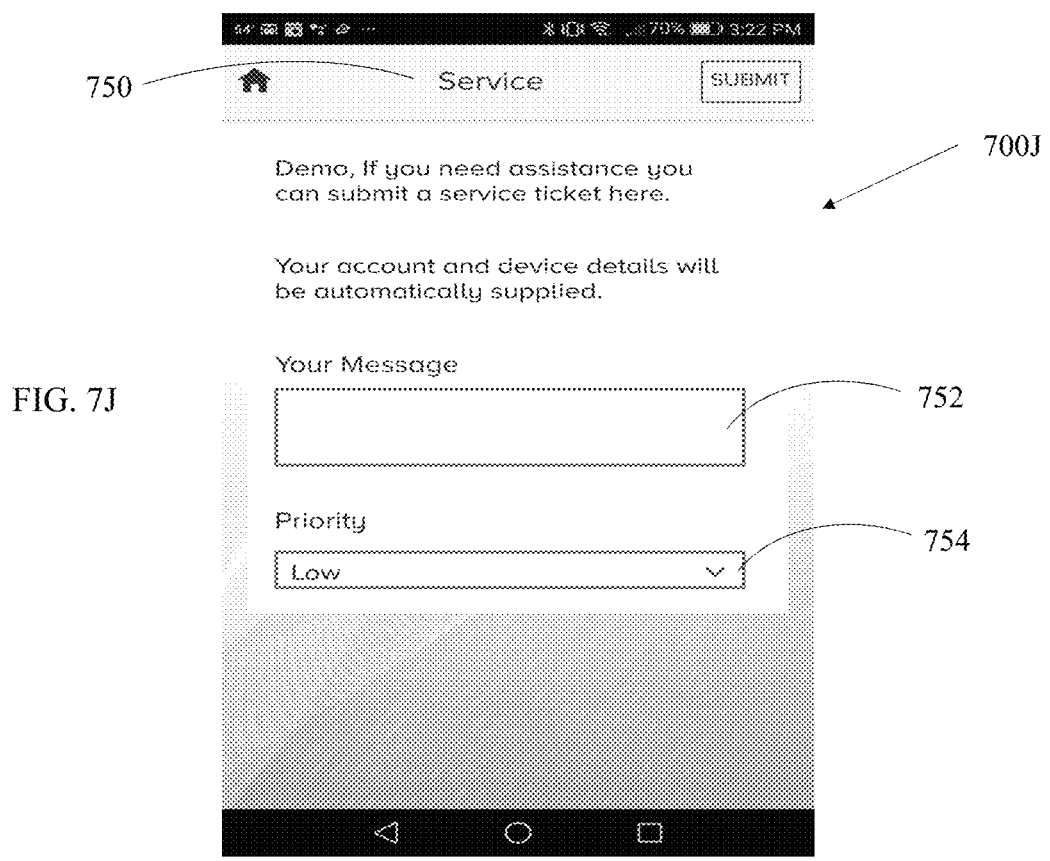

The user interface 700J for user access to the service function 750 is depicted in FIG. 7J. Via this interface 700 the user can submit service calls for the device 30 by entering a message 752 and indicating a priority level 754. This information is transmitted by the user device control 160 via the API to the smart box 110, which, in turn transmits the service call to the server 130. The server 130 access the service ticket data 134*d* database to determine the contact rules for service tickets for the subject device 30, and transmits the service call to the recipient identified in the service ticket data 134*d* database for the subject device 30.

Any of the afore-discussed functions may also be accessed using voice recognition via the user interface 700F depicted in FIG. 7F, and selecting the microphone 760.

In some cases, the functions available to the user via the user interface 700 provide access to further functions. For example, copy 720 and email 730 functions may provide an option to charge a client or customer for use of the device 30. It is typical for law firms and accounting forms, for example, to charge clients for copies. In such cases, a code must be entered designating the correct charge-to entity before the device 30 can be used. The present invention enables a user to access one or more databases of such codes located on the server 130, a remote server or other data storage device that is not connected to and may not be in the same network as the device 30 being accessed and controlled. The user interface 700G for the copy function 720 is depicted in FIG. 7G, and includes a "Bill To" pull-down menu 722 which provides the user with access to a database of client codes selectable by the user to designate a client to charge for use of the device 30. The client codes accessible to the user via the pull-down menu have been previously mapped to the user's account, thus providing limited and user-specific information.

Similarly, the user interface 700H for the email 730 function is depicted in FIG. 7H, and includes a "Bill To" pull-down menu 732 which provides the user with access to a database of client codes selectable by the user to designate a client to charge for use of the device 30. This user interface 700H also includes a "Recipient" field 734 that can be populated with one or more email addresses selected from the user's contacts. While an MFP can be configured and used to send email, it is limited to the contacts programmed into the MFP. With the present invention, the email function of an MFP is accessed and controlled in a way that enables the user to send emails from the MFP to recipients in the user's contact list, or from a contact list that is not known by the MFP or other device 30.

An aspect of the present invention provides the ability to intelligently manage one or more target electronic devices 30. As noted, the smart box 110 has super-user access to data collected and stored by a device 30. Such data may provide a variety of types of useful information about usage of the device 30 such as, for example, which paper trays are used most often, time-based use of the device 30, and other use and operational characteristics and data of the device 30. In accordance with embodiments of the present invention, the smart box 110, having access to this data, may use this data to intelligently control use of the device 30. For example, if an MFP has a plurality of paper trays configured for the same size paper, with one tray being a default tray, that tray is likely to be used more often than the others. As a result, parts of that tray are exposed to more use than parts of the other trays. Knowing this, the present invention can direct print, copy, etc., commands to effect a more uniform use of the device 30. This will result in greater longevity for the parts of the device 30, and a reduction in service calls and repairs.

The present invention can also be used to automate certain service conditions for a device 30. For a type of device, like an MFP, there may be a finite set of problems that occur with the greatest frequency. Once this set of problems is identified, the smart box 110 can be configured to automatically detect the occurrence of such a problem at a device 30 and automatically create a service call without the need for user involvement.

A licensing and data configuration file 134c may contain information specific to this user, including rules that define authorized and unauthorized features this user is permitted to access, and other rules defining permissible use by this use of the device 30. It is thus possible for the smart box 110 to initially flag a device transaction from a user, and to communicate with the server 130 to determine whether the device transaction violates a rule for that user. Information about user permissions may also be contained in a user account file 134e. The user account file 134e may contain, inter alia, one or more permissions for that user that serve to define device transactions that user is permitted to initiate. Such permissions may include, by way of non-limiting example, times of day the user is permitted to initiate a device transaction, type of device transactions allowed, e.g., print, email, document download, etc., size/frequency of a device transaction type, e.g., print jobs limited to not more than 500 pages per week.

Server 130 may, for example, be configured as an artificial intelligence-based analysis engine capable of analyzing a risk level associated with the device transaction based on data gathered by a smart box 110 for similar device transactions made on the device 30 as well as other similar devices 30 (e.g., devices 30 in the same private network 12). The server 130 can thus determine whether the device transaction is an anomaly or an exception, and if an exception, whether the exception has been or can be resolved. As noted, the smart box 110 functions as a universal controller, controlling user access to and use of devices 30. When a request for a device transaction is received by the smart box 110, it can determine if the device transaction is an exception or anomaly that is out of compliance with rules for the user. This can be determined by the smart box 110 alone, or together with the server 130. From the information in the data storage 136 specific to this user, e.g., in either or both 134c and 134e files, and based upon the device transaction request transmitted by the user device control 160, the server 130 may transmit information back to the smart box 110 providing a disposition command with respect to the requested device transaction, e.g., indicating that the device transaction has been executed or not.

In assessing a device transaction and determining whether it's an exception or there is a risk, server 130 will consider past experience with the requesting user, the device 30, and other similar devices 30, as well as other pertinent information that may be available to the server 130 (for example, suspect production request patterns reported by other document production centers), the server 130 may prepare a request disposition and transfer this information to the smart box 110 to guide the response of the smart box 110 to the document production request. For example, the response disposition may authorize the smart box 110 to instruct the device 30 to proceed to fulfill the document request in its entirety ("green light").

Alternatively, if the server 130 concludes that there is some risk associated with the document request or finds that the request will exceed document production features and permissions either for the user or the type of device transaction (for example, excessively-high page counts), the request disposition may instruct the smart box 110 to provide altered instructions to the document processing device ("yellow light"). For example, the request disposition may instruct the smart box 110 to diminish the requested number of copies or rate of printing of copies as would be expected in response to the production request. Alternatively, the smart box 110 may be instructed to forward the document request to another smart box 110 associated with a device 30 that, for example, has been reserved and isolated for production requests identified as presenting some risk.

Finally, if the server 130 concludes that the production request presents a significant risk or is well outside the limits of associated production features and permissions, the request disposition may call for the rejection of the production request ("red light"). If the product request is at least partially executed, the smart box 110 may preferably collect execution information from the device 30 providing details about the execution and/or information about the current state and resources available to the device 30. In any case, the device 30 is still available to other users regardless of whether a device transaction request by a particular user is denied.

Embodiments of the present invention are also directed to a system and method for recommending a transaction to replace a device based, at least in part, on a total cost of ownership of the device. Regardless of the type of device, how much it costs an owner of the device over its lifetime, or for the time during which the owner is using the device is an important factor in deciding whether to buy, lease, replace, etc., the device. As noted above, the term "device" is used herein broadly to describe anything that is replaceable. In preferred embodiments, a device is an electronic device that may be a singular electronic device, or one or more electronic devices connected or connectable via any means that can communicate with each other. This term is further used in an expansive way, intended to encompass any type of known or hereafter developed device usable in connection with, or suitable for carrying out all or part of, the present invention. In alternative embodiments, a device may be any device, system or apparatus that is replaced with some regularity and frequency. This may include, by way of non-limiting example, any type of business, industrial, commercial, residential, consumer, individual, or personal device, system or apparatus. In still other embodiments, the present invention is directed to services of any type that may be evaluated with some regularity and frequency.

As noted, an important factor when replacing a device is how much the replacement device will cost to own. This calculus is typically conducted based upon certain assumption regarding usage of the device and the replacement device—the assumptions being based upon perceived usage patterns for the device. Consequently, a calculated total cost of ownership for the device and/or the replacement device is imprecise at best, and guess-work at worst. In accordance with embodiments of the present invention a method and system for recommending a transaction to replace a device is based, at least in part, on actual data usage collected and stored for the devices (for example, both target and replacement). The method of the present invention recommends a transaction for replacing a device based upon total cost of ownership of the device by collecting usage data of the device, storing the usage data at a location remote from the device, determining a replacement device based upon the usage data of the device, determining a total cost of ownership of the replacement device based upon the usage data of the device, comparing the total cost of ownership of the replacement device and the total cost of ownership of the device, and providing a recommendation for a transaction to replace the device with the replacement device when the total cost of ownership of the replacement device is less than or equal to the total cost of ownership of the device. In an alternative embodiment of the present invention, a method may be directed to recommending a transaction to replace a device based upon the total cost of ownership of the device by collecting usage data of the device, storing the usage data at a location remote from the device, receiving a target total cost of ownership savings value, determining a replacement device based upon the usage data of the device, determining a total cost of ownership of the replacement device based upon the usage data of the device, comparing the total cost of ownership of the replacement device and the total cost of ownership of the device, and providing a recommendation for a transaction to replace the device with the replacement device when difference between the total cost of ownership of the replacement device and the total cost of ownership of the device is greater than or equal to the total cost of ownership savings value. Embodiments of the present invention may also be directed to systems designed and configured to carry out the methods of the present invention.

Advantageously, the smart box 110 of the present invention may be used to collect and store usage data of a plurality of devices, including a device being replaced. This is a substantial improvement over the prior art, where usage data has only been made available to a device manufacturer and its authorized representatives, and then typically for contract compliance and maintenance. The present invention provides access to device usage data to stakeholders to ownership, use, service, etc., of the device. Such access enables stakeholders to use the usage data to determine a total cost of ownership of the device and the replacement device based upon actual usage data, resulting in a more accurate and useful TCO value. With the present invention, stakeholders can assess whether a device is suited for the needs of the environment within which it is deployed. For example, a business owner may determine whether a MFP is over or under-specified based upon the actual use of the MFP—not based upon assumptions, guess-work or conjecture, but based upon actual usage data. Methods of the present invention also enable a stakeholder to select a replacement device that is suited for the actual usage of the replaced device. The inventive methods accelerate the process for replacing devices by enabling a recommendation for a transaction for a replacement device to be triggered when a TCO calculated for the replacement device is less than or equal to a TCO of the current device, or alternatively, when difference between the TCO of the replacement device and the TCO of the current device is greater than or equal to a predefined TCO savings value. A sales rep need not wait until expiration (or an approaching expiration) of an existing lease contract to recommend a replacement device. With the present invention, the sales rep can make a replacement recommendation explicitly based upon determined TCO values for the current device and replacement device. In addition, the sales/replacement process can be automated, obviating the need to pay sales commissions.

Not only does the present invention use a conventional device in an unconventional way, embodiments of the present invention are tied to a specific structure, connection and arrangement of components, purposefully structured, connected and arranged to achieve an inventive technological solution to a technological problem specific to electronic devices and systems—the inability of a user to control the replacement based upon actual usage data and based upon total cost of ownership comparisons that are also based upon actual usage data. The result is optimization of device selection, deployment and use because it is now based upon collected and analyzed actual usage data.

Figure 8A:
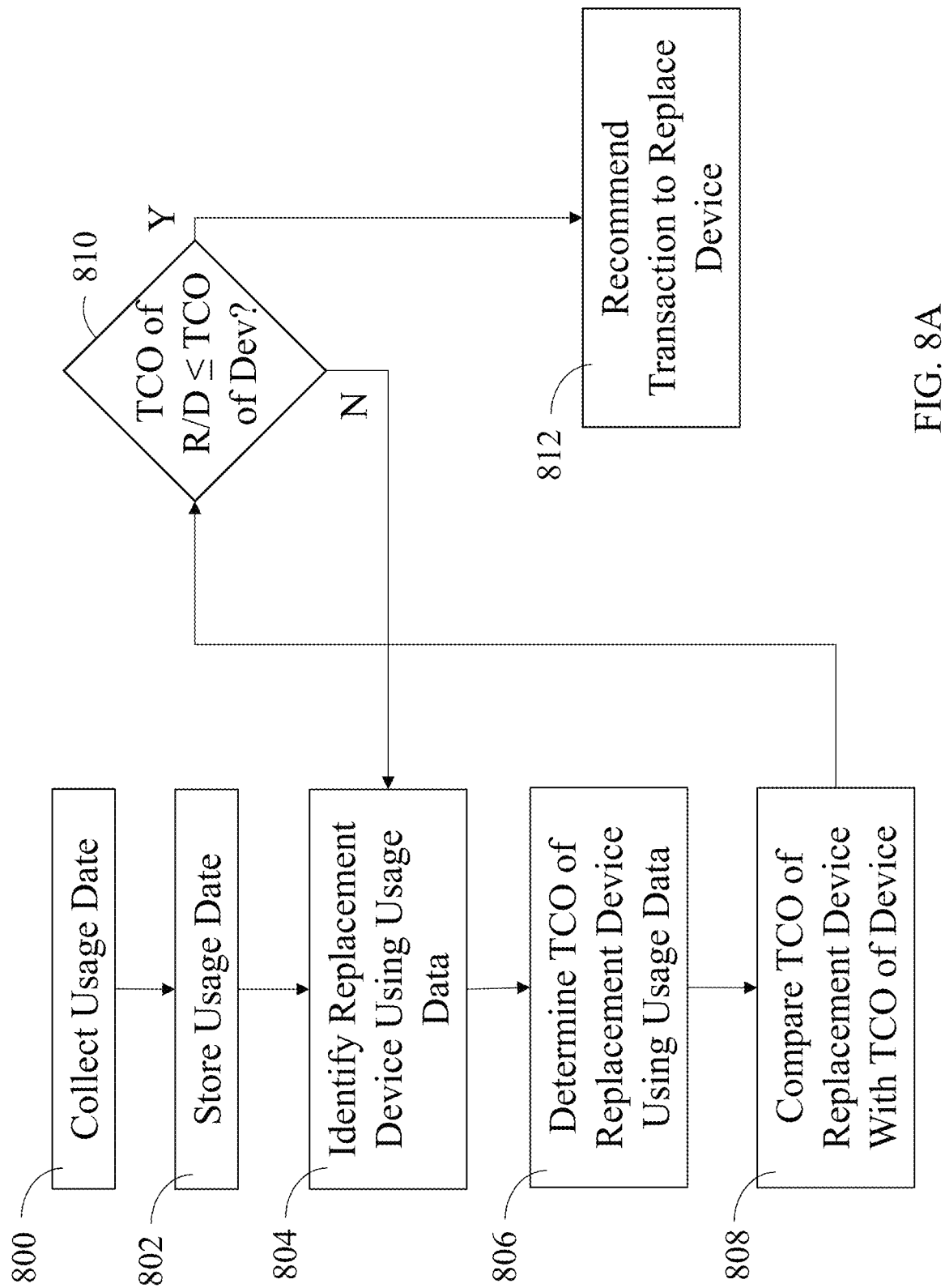
FIG. 8A is a flow diagram of a method in accordance with embodiments of the present invention for recommending a transaction to replace a device that considers actual device usage data to calculate a total cost of ownership of the device.
Figure 8B:
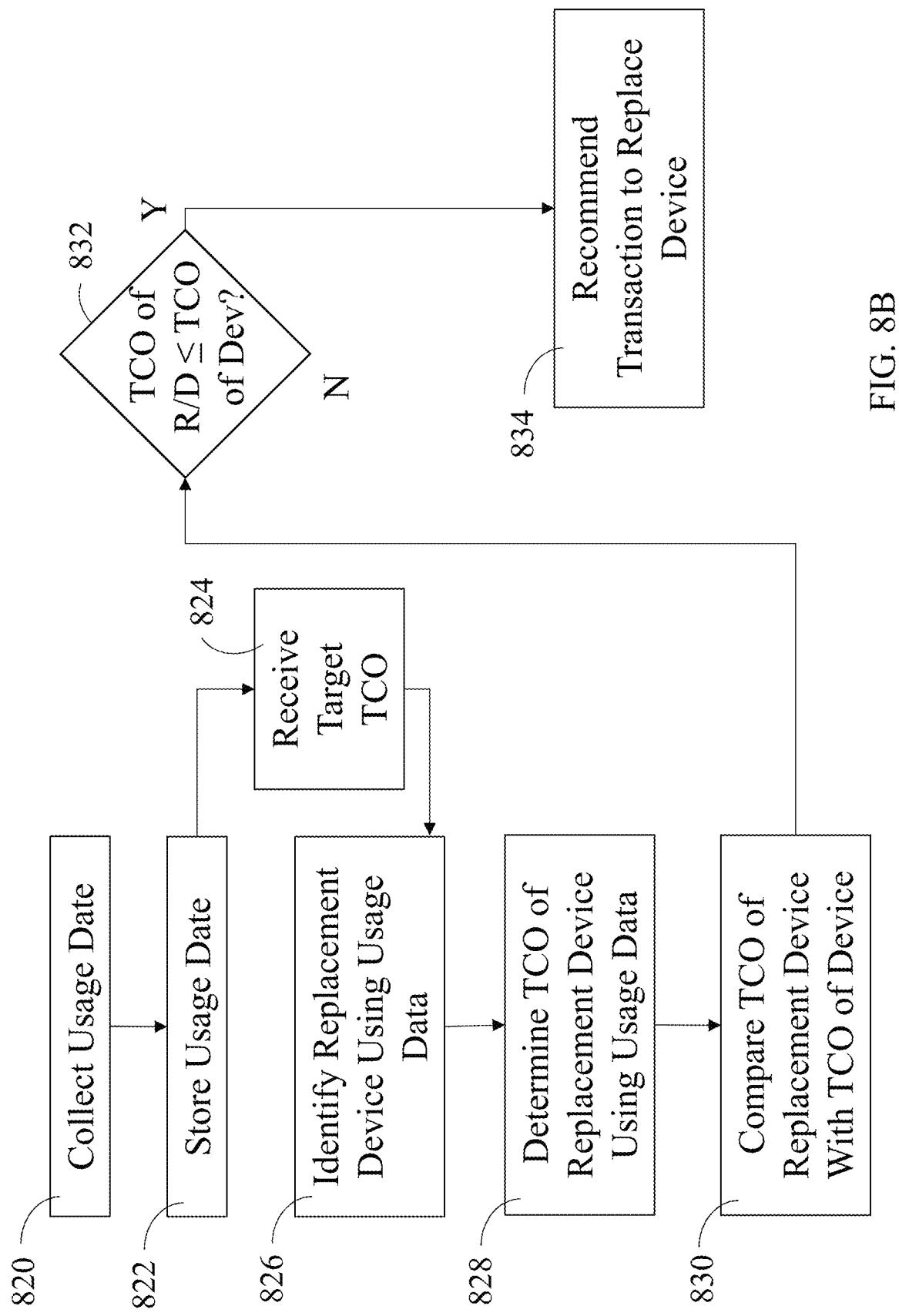
FIG. 8B is a flow diagram of a method in accordance with embodiments of the present invention for recommending a transaction to replace a device that considers actual device usage data to calculate a total cost of ownership of the device.

Referring next to FIGS. 8A and 8B, a method for recommending a transaction to replace a device based upon a total cost of ownership of the device in accordance with an embodiment of the present invention will now be discussed in greater detail. For ease of discussion, the device to be replaced will be referred to as the target device. At step 800, a smart box 110 in communication with a target device 30 collects usage data of that device 30. Device usage data may preferably be collected automatically on a regular or periodic basis, or alternatively on an episodic basis, where usage data is collected upon request.

Where the target device 30 is a MFP, usage data can include, by way of illustration and not limitation, data about the number and/or volume of print jobs, copy jobs, fax jobs, and/or email jobs carried out by the target device 30. Usage data may also comprise day, date, and time of usage, idle time(s), data regarding the MFP component usage, e.g., which paper tray, print cartridges, etc. It is readily conceivable that a variety of additional types of usage data may alternatively or in addition be collected, and as such these are within the scope and spirit of the present invention. In addition, the present invention is not limited to multifunction printers as "devices," nor to electronic devices nor any other restrictive or limiting interpretation of the word "device." The present invention provides the benefits and advantages discussed herein, and is useful for optimizing device identification based upon actual usage data and further based upon using that data to calculate and compare a total cost of ownership of an existing device to a total cost of ownership of one or more replacement devices. The present invention thus finds usefulness and practical application for virtually any device, system, apparatus, etc., that is replaceable by purchase or lease, typically with some regularity and frequency—a car or printer lease being just two illustrative, non-limiting examples.

The collected device usage data of the target device 30 may be temporarily stored by the smart box 110 in its resident memory, in data storage 136 of the server 130—in a device usage profile 134a, or in a device usage profile 154a of data storage 156 of a cloud server 150, at step 802. The device usage profile 134a, 154a provides a form of specification for the target device 30 in that the profile contains characteristics of that device. For example, the device usage profile may contain characteristics such as actual usage data for the target device 30 relating to certain useful components, functions, parameters, etc. of that device. Using usage data for the target device 30 from a device usage profile 134a or 154a, the server special purpose software 132 can identify one or more potential replacement devices by comparing characteristics of the target device from the device usage profile with characteristics of one or more potential replacement devices from a replacement device profile stored in server data storage 136, cloud server data storage 154, or where otherwise accessible by the server special purpose software 132. For example, the server special purpose software 132 may compare target device usage data that indicates a volume of print jobs for a given time period for the target device 30 with potential replacement devices capable of handling such a volume of print jobs. The server special purpose software 132 may compare all usage data or only such usage data as defined or selected by a stakeholder for a target device 30 with applicable specifications and/or data for one or more replacement devices. The server special purpose software 132 is thus able to identify one or more suitable replacement devices based upon the usage data of the target device 30, at step 804. A stakeholder can also provide input useful for identifying suitable replacement devices, see, e.g., FIG. 10B. The server special purpose software 132 is next able to calculate a total cost of ownership for each of the one or more replacement devices, at step 806, again by considering the usage data of the target device 30, which provides data about actual usage of the target device 30 collected over time. This data represent how the target device 30 is used, and thus is the best source for calculating a total cost of ownership of the target device and for a replacement device. At step 808, the server special purpose software 132 compares the total cost of ownership of the target device 30 with that of the one or more replacement devices. If the TCO of one of the replacement devices is less than or equal to the TCO of the target device 30, as determined at step 810, a recommendation is generated and transmitted, at step 812 to a stakeholder for a transaction to replace the target device 30 with a replacement device, resulting in a TCO decrease and overall cost savings for the stakeholder. If the TCO of one of the replacement devices is not less than or equal to the TCO of the target device 30, as determined at step 810, the server special purpose software 132 loops to step 804 and continues.

In the context of the present invention, the term "recommendation" may be embodied in a number of different ways. For example, the present invention may provide a recommendation in the form of proposed terms and conditions for lease of the replacement device, with this type of recommendation being communicated to a stakeholder decision-maker responsible for replacing one or more currently installed devices. A recommendation may be generated and provided automatically to one or more stakeholders, or it may be generated by an associate (who may also be a stakeholder, or not), who then provides the recommendation to one or more stakeholders. See also FIG. 10J and the disclosure herein associated therewith.

Referring next to FIG. 8B, a method for recommending a transaction to replace a device based upon a total cost of ownership of the device in accordance with an embodiment of the present invention will now be discussed in greater detail. At step 820, a smart box 110 in communication with a target device 30 collects usage data of that device 30. This may be an on-going process, where device usage data is collected automatically on a regular or periodic basis, or it may be episodic, where usage data is collected upon request.

Where the target device 30 is a MFP, that usage data can include, by way of illustration and not limitation, data about the number and/or volume of print jobs, copy jobs, fax jobs, and/or email jobs carried out by the target device 30. Usage data may also comprise day, date, and time of usage, idle time(s), data regarding the MFP component usage, e.g., which paper tray, print cartridges, etc. It is readily conceivable that a variety of additional types of usage data may alternatively or in addition be collected, and as such these are within the scope and spirit of the present invention.

The collected device usage data may be temporarily stored by the smart box 110 in its resident memory, in data storage 136 of the server 130—in a device usage profile 134a, or in a device usage profile 154a of data storage 156 of a cloud server 150, at step 822. A stakeholder may enter a target TCO savings value, at step 824, that may be stored as part of the device usage profile 134a if intended for a specific target device, or it may be stored in server data storage 136 so as to be usable for any target device. A target TCO savings value may be expressed as a percentage savings, e.g., 10% less than the current TCO, or it may be expressed as a fixed dollar amount, e.g., $100 per year, and may be usable for any target device.

Using usage data for the target device 30 from a device usage profile 134a or 154a, the server special purpose software 132 identifies a replacement device by comparing usage data of the target device 30 with specifications for one or more potential replacement devices—such specifications being stored in server data storage 136, cloud server data storage 154, or where otherwise accessible by the server special purpose software 132. For example, the server special purpose software 132 may compare target device usage data that indicates a volume of print jobs for a given time period for the target device 30 with potential replacement devices capable of handling such a volume of print jobs. The server special purpose software 132 may compare all usage data or only such usage data as defined or selected by a stakeholder for a target device 30 with applicable specifications for one or more replacement devices. The server special purpose software 132 is thus able to identify one or more suitable replacement devices based upon the usage data of the target device 30, at step 826. The server special purpose software 132 is next able to calculate a total cost of ownership of each of the one or more replacement devices, at step 828, again by considering the usage data of the target device 30, which provides data about actual usage of the target device 30 collected over time. This data represent how the target device 30 is most likely to be used, and thus is the best source for calculating a total cost of ownership of the target device and for a replacement device. At step 830 the server special purpose software compares the total cost of ownership of the target device 30 with that of the one or more replacement devices. If the difference between the TCO of the replacement device and the TCO of the target device is greater than or equal to the TCO savings value, as determined at step 832, a recommendation is generated and transmitted, at step 834 to a stakeholder for a transaction to replace the target device 30 with a replacement device, resulting in a TCO decrease and overall cost savings for the stakeholder. If the difference between the TCO of the replacement device and the TCO of the target device is not greater than or equal to the TCO savings value, as determined at step 832, the server special purpose software 132 loops to step 826 and continues.

Figure 10A:
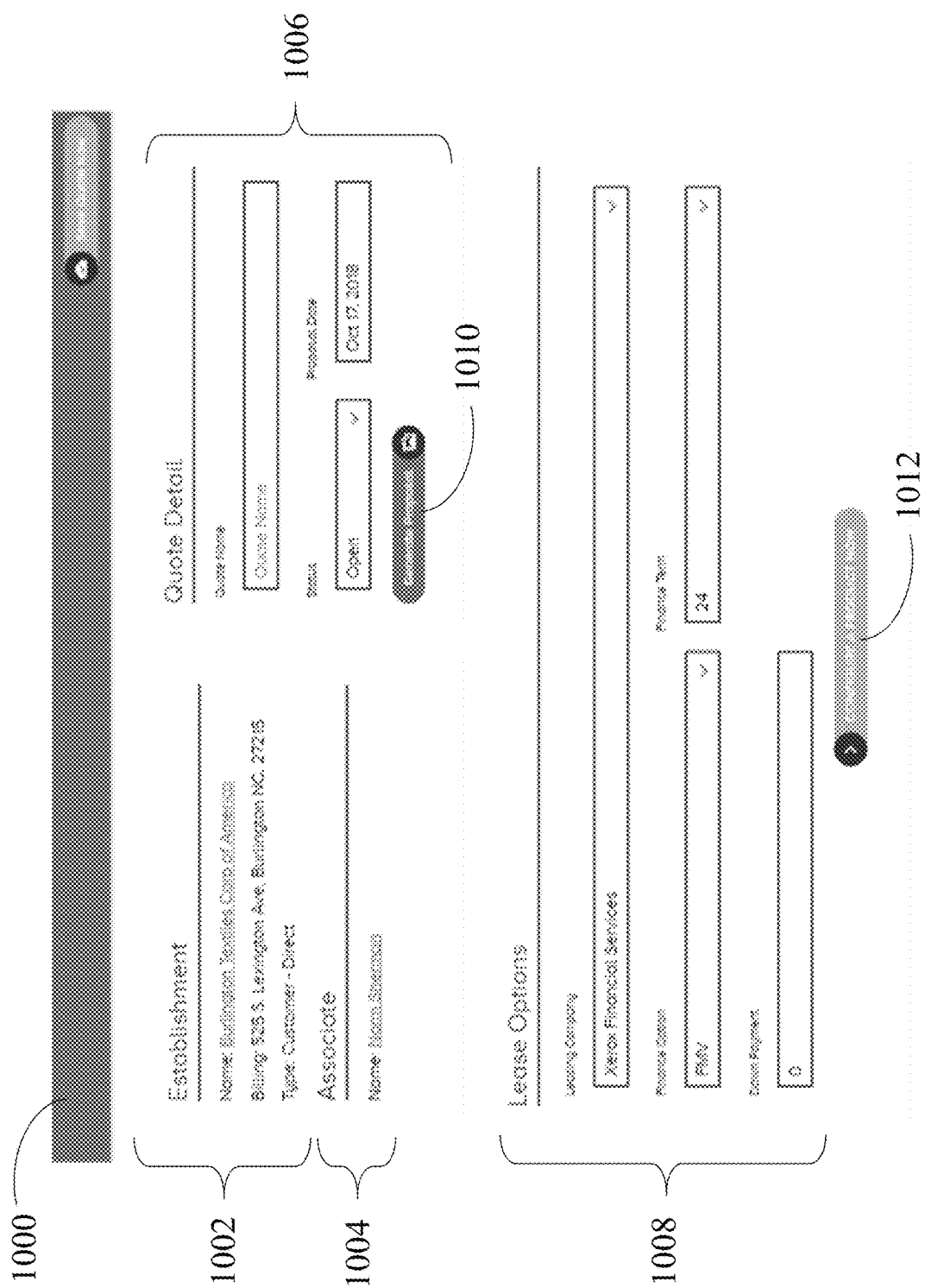
Figure 10B:
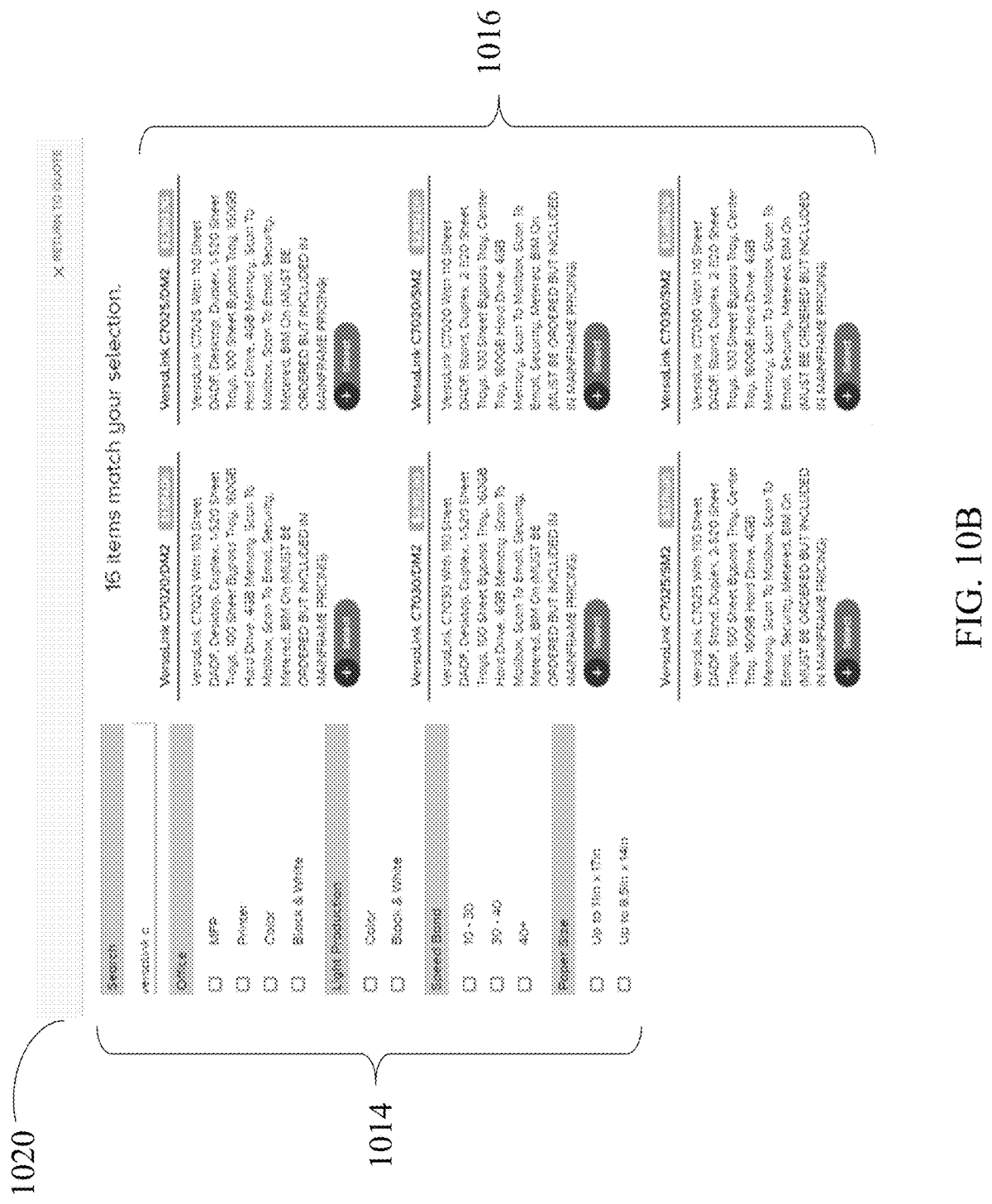
Figure 10C:
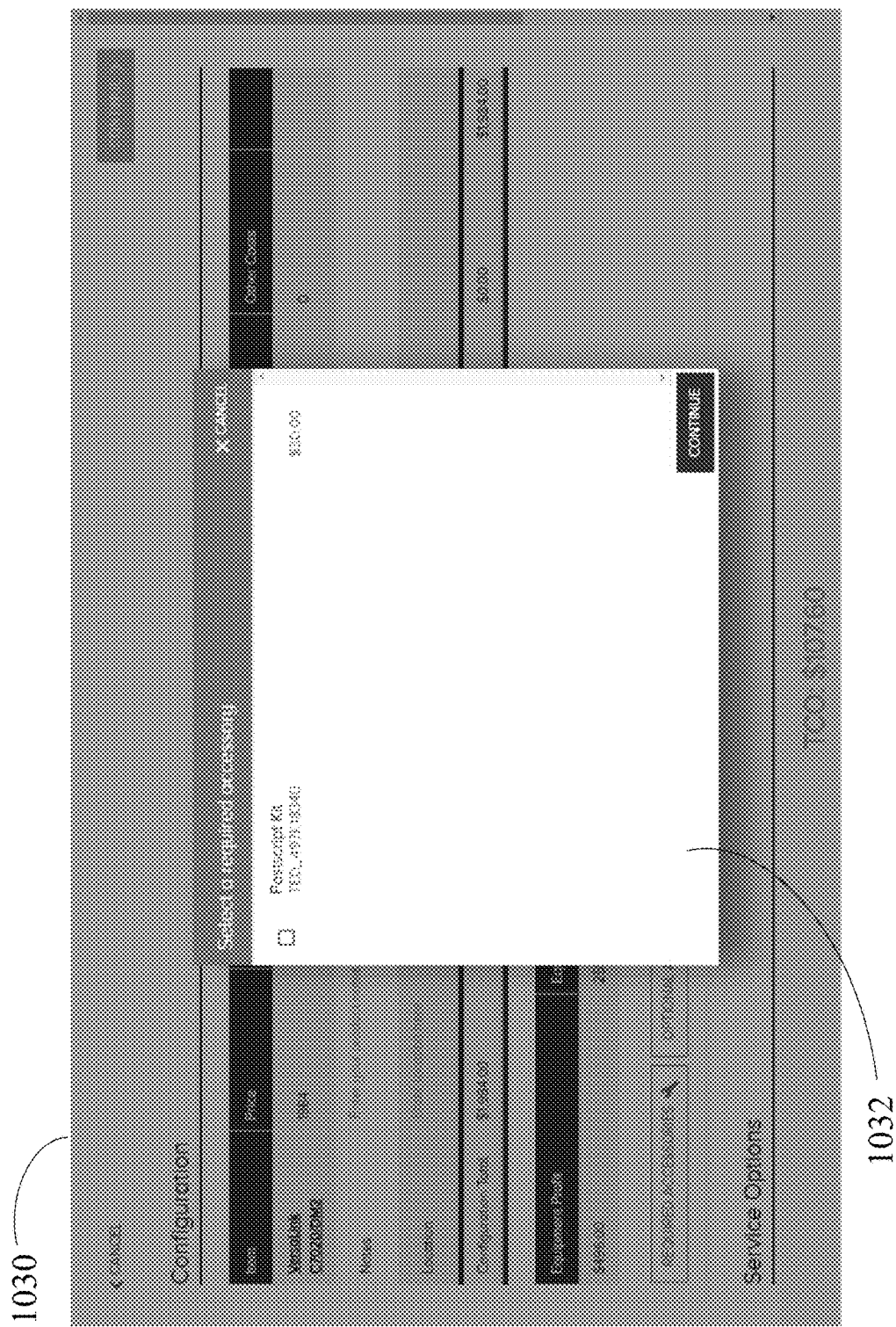

With reference next to FIGS. 10A-10J, use of the present invention with be further discussed in the context of a user interface with aspects of the present invention. Aspects of the present invention may be utilized by a user (i.e., stakeholder) as a tool typically referred to as CPQ—configure, price, quote—that facilitates preparation of quotes for the sale and lease of devices. In an embodiment of the present invention, a CPQ tool is provided as an application on a platform such as, by way of non-limiting example, Salesforce, that enables building, installing and running applications within the Salesforce environment and platform. The CPQ tool embodiment of the present invention is such an application. As such, the CPQ tool provides a user with a plurality of user interfaces for carrying out a plurality of operations and functions of the present invention—illustrative and non-limiting exemplary interfaces being depicted in FIGS. 10A-10J. When the CPQ application is launched or accessed by a user on a user electronic device 20, a home screen 1000 as shown in FIG. 10A may be displayed. A user accesses the environment within which the CPQ tool is made available (e.g., Salesforce.com) by logging in to that environment. For example, a company having access to Salesforce.com will have an account thereon, and can access certain features and functionality of the Salesforce.com environment via that account—one such feature being the CPQ tool of the present invention. The Salesforce.com account "knows" certain information about an account, and that information is thus knowable by the CPQ tool and usable in connection with the present invention. For example, a typical user would be a stakeholder of a company, identified as an Establishment 1002 having certain characteristics. Details about the Establishment may be accessed and used by the CPQ tool. A stakeholder may utilize the CPQ tool, identified as an Associate 1004 in FIG. 10A. General details about a quote prepared using the CPQ tool may be entered in the Quote Detail section 1006, including, by way of illustrative, non-limiting example, a Quote Name, Status, e.g., Open, Closed, Processing, and a Proposal Date. Once further details of a quote have been provided by the stakeholder through the CPQ tool, as described in further detail below, the stakeholder may generate a proposal by selecting the Generate Proposal button 1010.

Figure 10D:
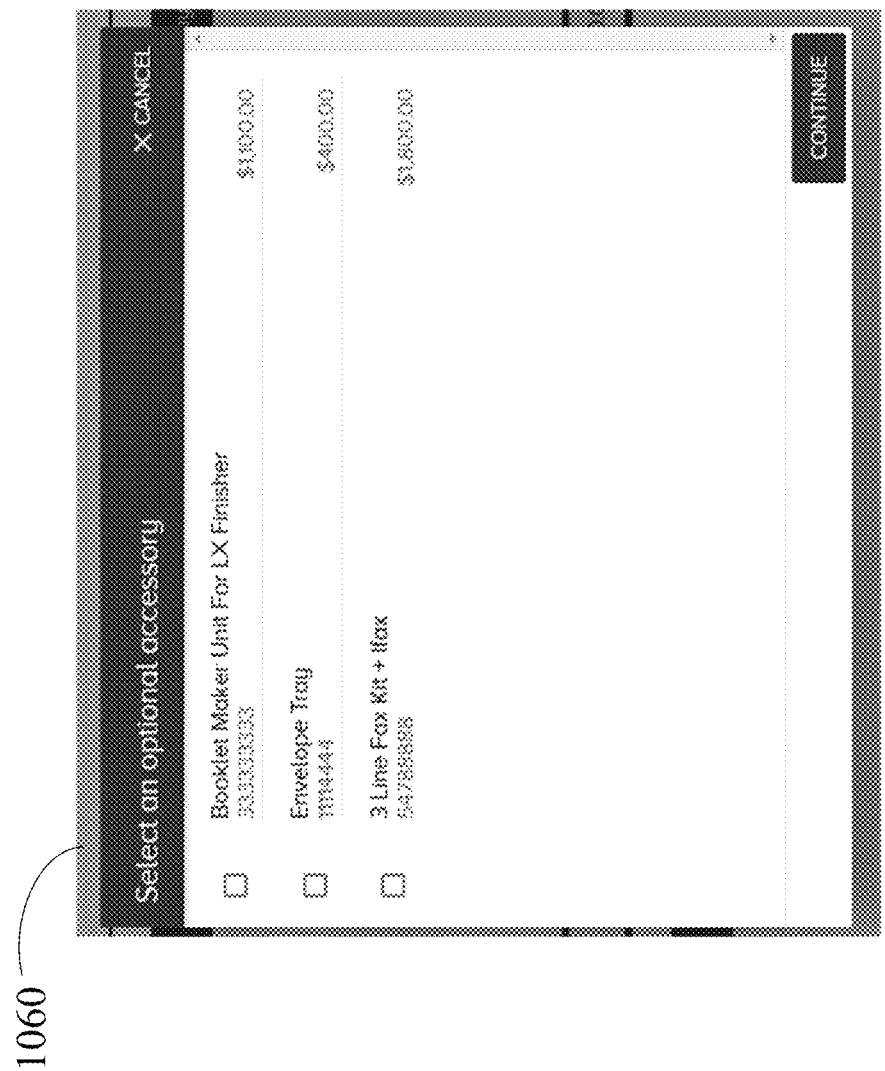

Lease Options 1008 such as Leasing Company, Finance Option, Finance Term, and Down Payment can be populated after a stakeholder enters one or more product configurations by selecting the Configure a Product Now button 1012, which directs the stakeholder to a product configuration screen 1020, as depicted in FIG. 10B. As a first step a stakeholder can select one or more search criteria 1014, which will search a database and will display products 1016 that match one or more of the search criteria. The stakeholder can select one or more products identified by the search for use in generating a quote. In some cases, a product will require one or more accessories, in which case the lightbox 1032 of FIG. 10C will be displayed, requiring the stakeholder to selected the required accessory(ies). In addition to Required Accessories, which may be added via the lightbox 1032 of FIG. 10C, or by stakeholder selection of the Required Accessories button 1034 of FIG. 10E, optional accessories may be added by selecting the Optional Accessories button 1036. Stakeholder selection of that button causes the CPQ tool of the present invention to display an optional accessories lightbox 1060, as depicted in FIG. 10D, via which a stakeholder may select one or more optional accessories of the product to be used for generating a quote to replace the currently installed product.

Figure 10F:
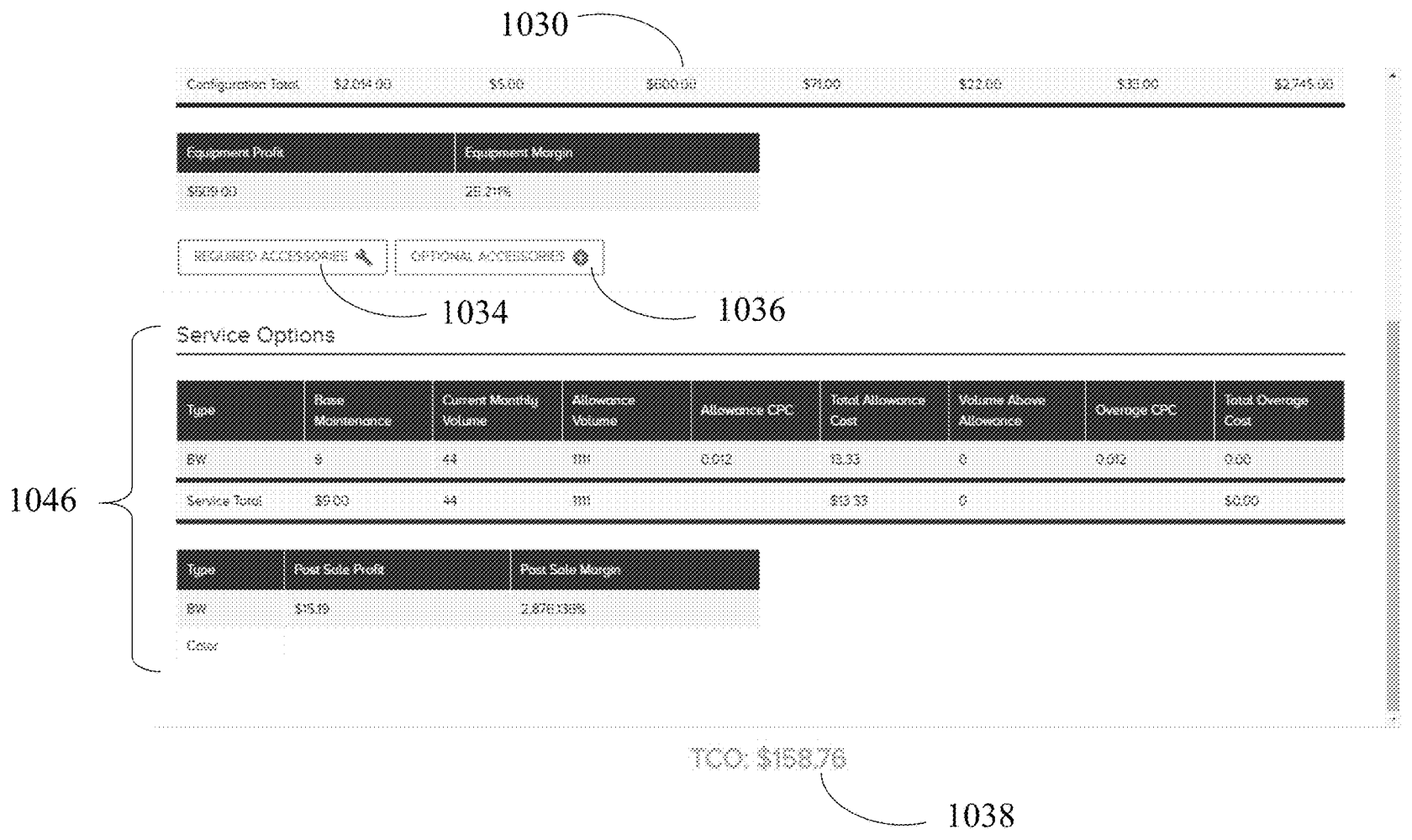

Upon selection of the required and optional accessory(ies) the stakeholder is directed to a Quote Configuration Screen 1030, depicted in FIGS. 10E and 10F. On the screen the present invention displays a Configuration quote 1042 for at least one product previously selected by the stakeholder. Included in the Configuration quote 1042 may be itemized costs for the product, including Price, Profit Margin, Analyst Fees, Shipping, Buyout (for currently-installed product(s)), and Other Costs, all of which are useful in calculating a total cost of ownership of the selected product. Additionally, fewer or other product cost data may be provided in accordance with embodiments of the present invention. The Quote Configuration Screen 1030 also depicts cost data for Service Options 1046, including Base Maintenance, Current Monthly Volume, Allowance Volume, Allowance Cost Per Copy (CPC), Total Allowance Cost, Volume Above Allowance, Overage CPC, and Total Overage Cost. Additional, fewer or other service option cost data may be provided in accordance with embodiments of the present invention. Product cost data and service option cost data may be obtained by the CPQ tool and present invention from any of a plurality of databases accessible by the CPQ tool, including a product/product specification database, a service agreement database—within which one or more service agreements of the Establishment may be stored and accessed, and other public and private sources of information and data useful for carrying-out aspects of the present invention. Cost data used by the CPQ tool to prepare a Quote Configuration may be used to calculate a TCO for the proposed replacement product, as indicated at 1038 of FIG. 10F.

The present invention uses the usage data for the already installed product (i.e., device), as well as other relevant data such as lease and usage terms for that product, and the cost data for the proposed replacement product to calculate a TCO for that product. This TCO may be compared with a TCO for the currently installed product to determine which product is more cost effective, and also the timing for replacing the existing product with the proposed new product.

Figure 10G:
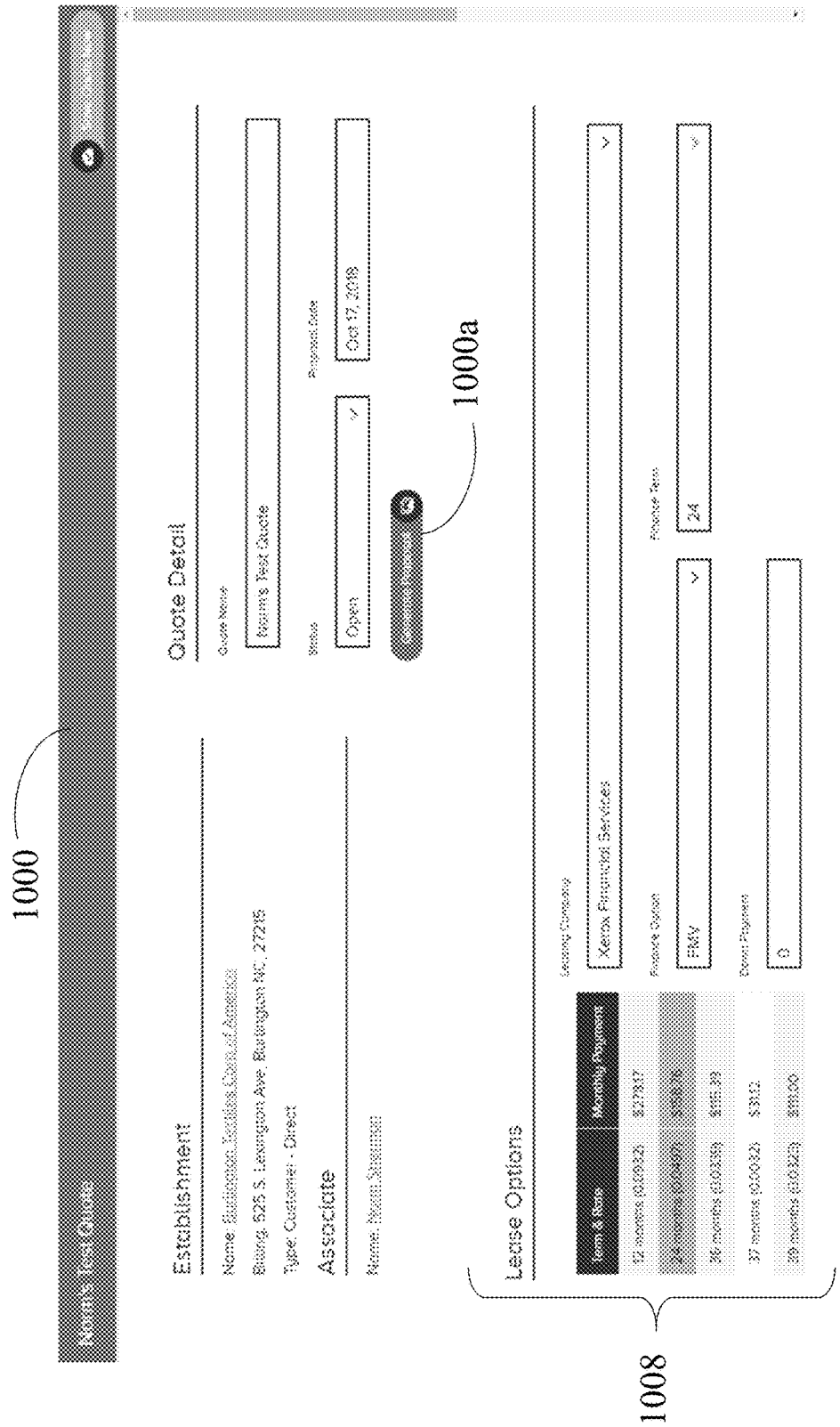
Figure 10H:
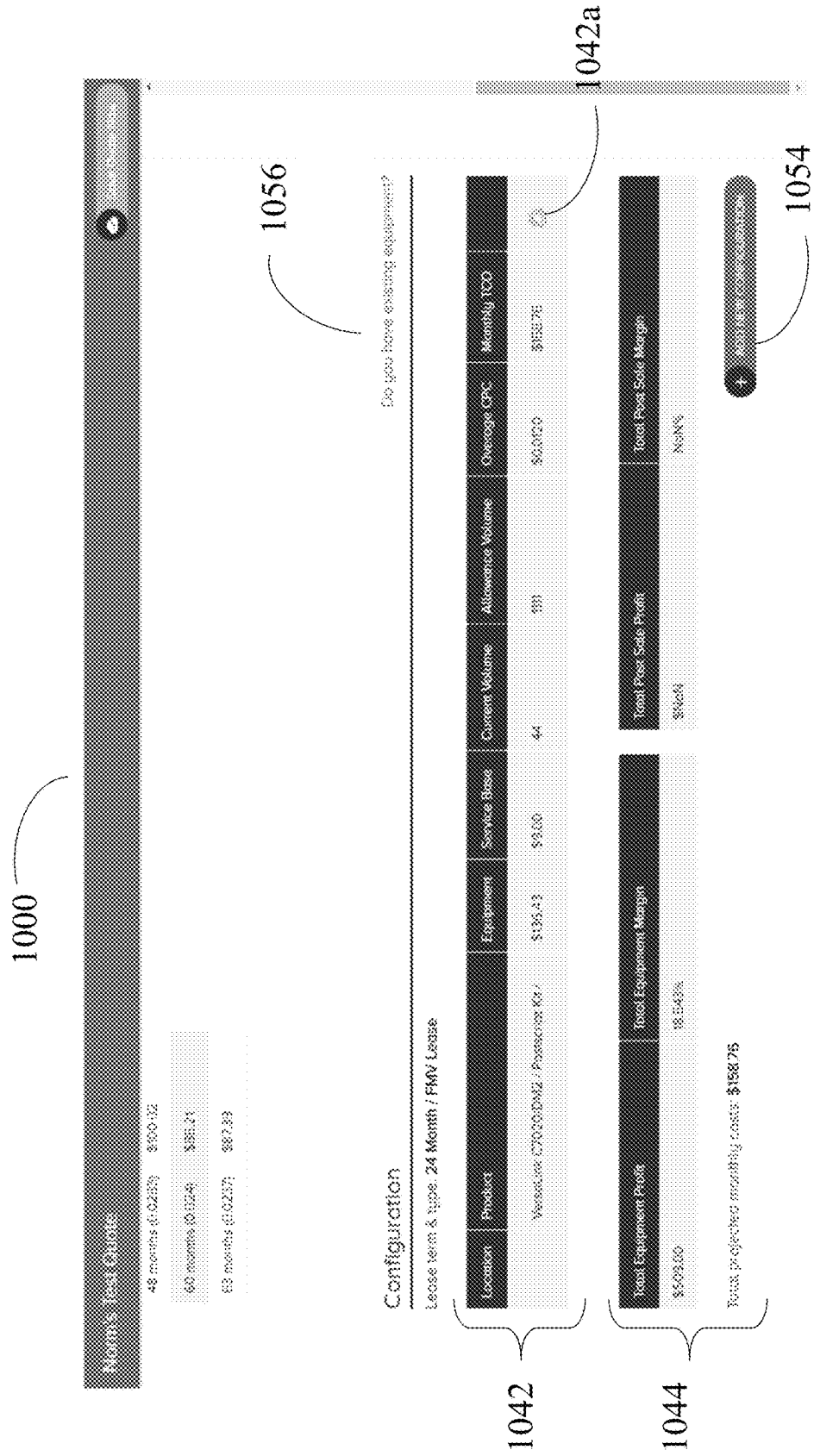
Figure 10I:
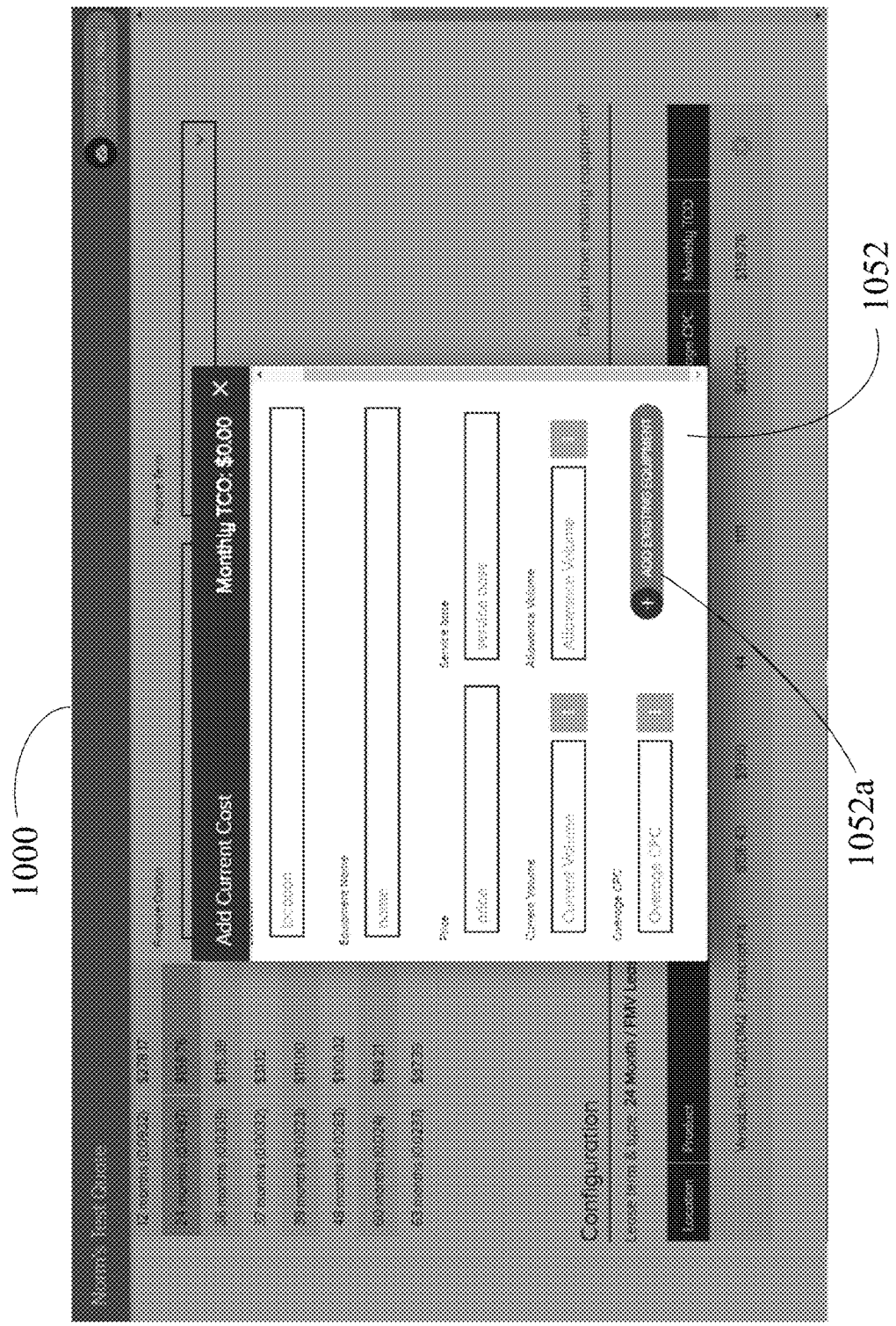
Figure 10J:
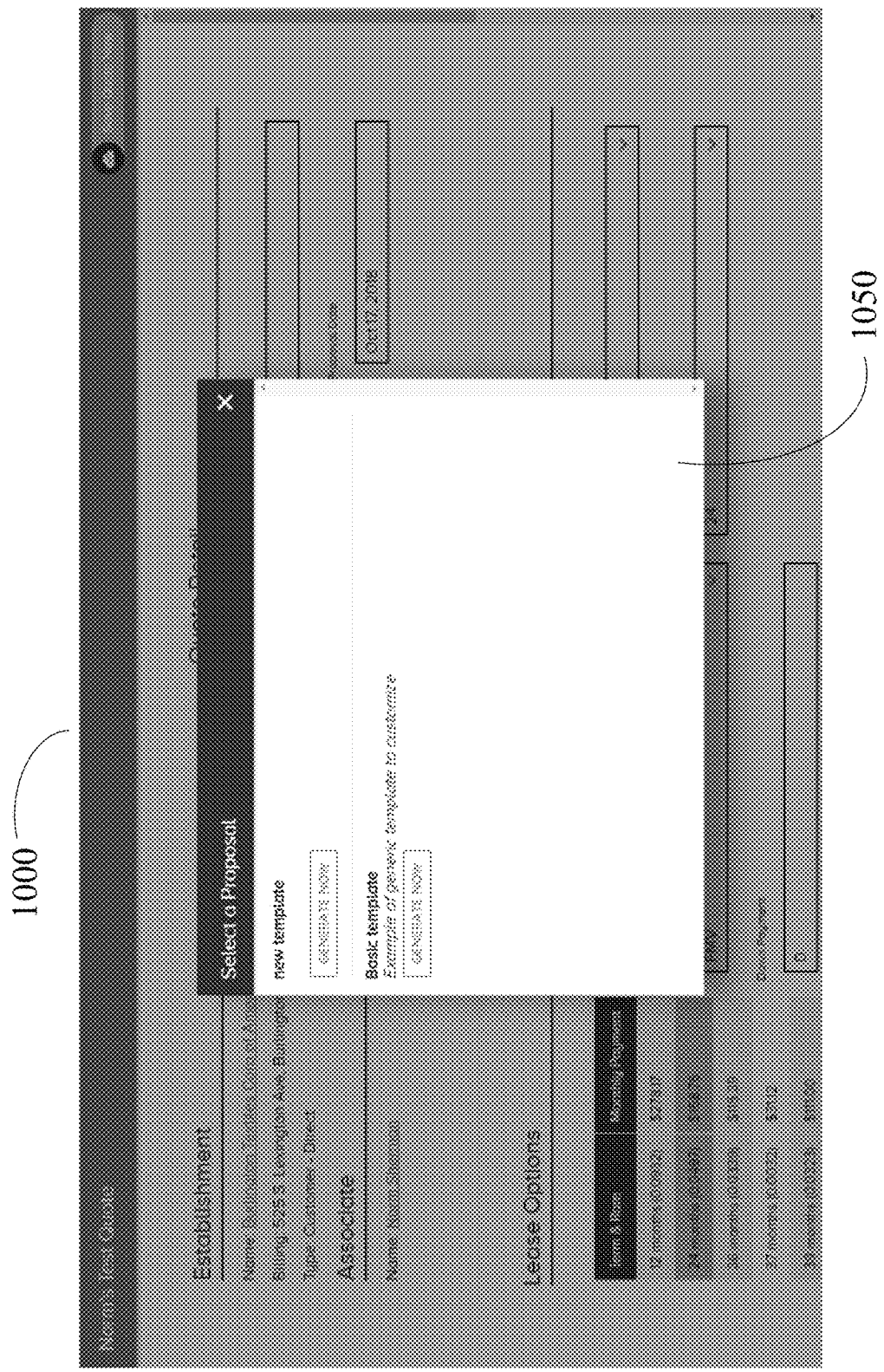

Once a stakeholder has completed a quote configuration, selection of the Continue button 1062 of FIG. 10E returns the stakeholder to the Home Page 1000 which now presents a plurality of Lease or Quote Options, as depicted in FIG. 10G. The plurality of Lease or Quote Options 1008 enable the stakeholder to compare the monthly cost of the various Options to determine which best fits the particular circumstances. FIG. 10H depicts a second part of the Home Page 1000 of FIG. 10G, now configured based upon stakeholder input and further based upon usage data. This figure shows a Configuration 1042 for a specific Product (VersaLink . . . ), Lease term (24 months) and Type (FMV), and projected profit, profit margin and monthly cost 1044 for that Configuration. Selecting the gear button 1042a enables a stakeholder to change this Configuration. A stakeholder can also add a new configuration by selecting button 1054, and/or add data on currently installed equipment by selecting link 1056, in which case the lightbox 1052 of FIG. 10I is presented. The lightbox 1052 contains a plurality of fields for a stakeholder to enter information about the currently installed equipment such as, by way of non-limiting example, location, equipment name, price, service name, and pull-down menus for entering current volume, allowance volume, and overage CPC information. A calculated monthly TCO for the currently installed equipment will be displayed in the lightbox 1052. Selecting the Add Existing Equipment button 1052a returns the stakeholder to the home page 1000 of FIGS. 10G and 10H. At this point, a stakeholder has configured one or more proposed replacement products, selected a preferred option (e.g., lease, terms, etc.), and added any currently installed products to the CPQ tool. Selecting the Generate Proposal button 1000a will cause the Select a Proposal lightbox 1050 to be displayed, via which a stakeholder can select a proposal in a user-defined format for CPQ tool to generate. Thus, the present invention provides a recommendation via the proposal for a transaction to replace a device. This proposal can be used to further discuss replacement of the currently installed products with the proposed new products, resulting in a lower TCO based upon actual usage data for the currently installed products.

Figure 9:
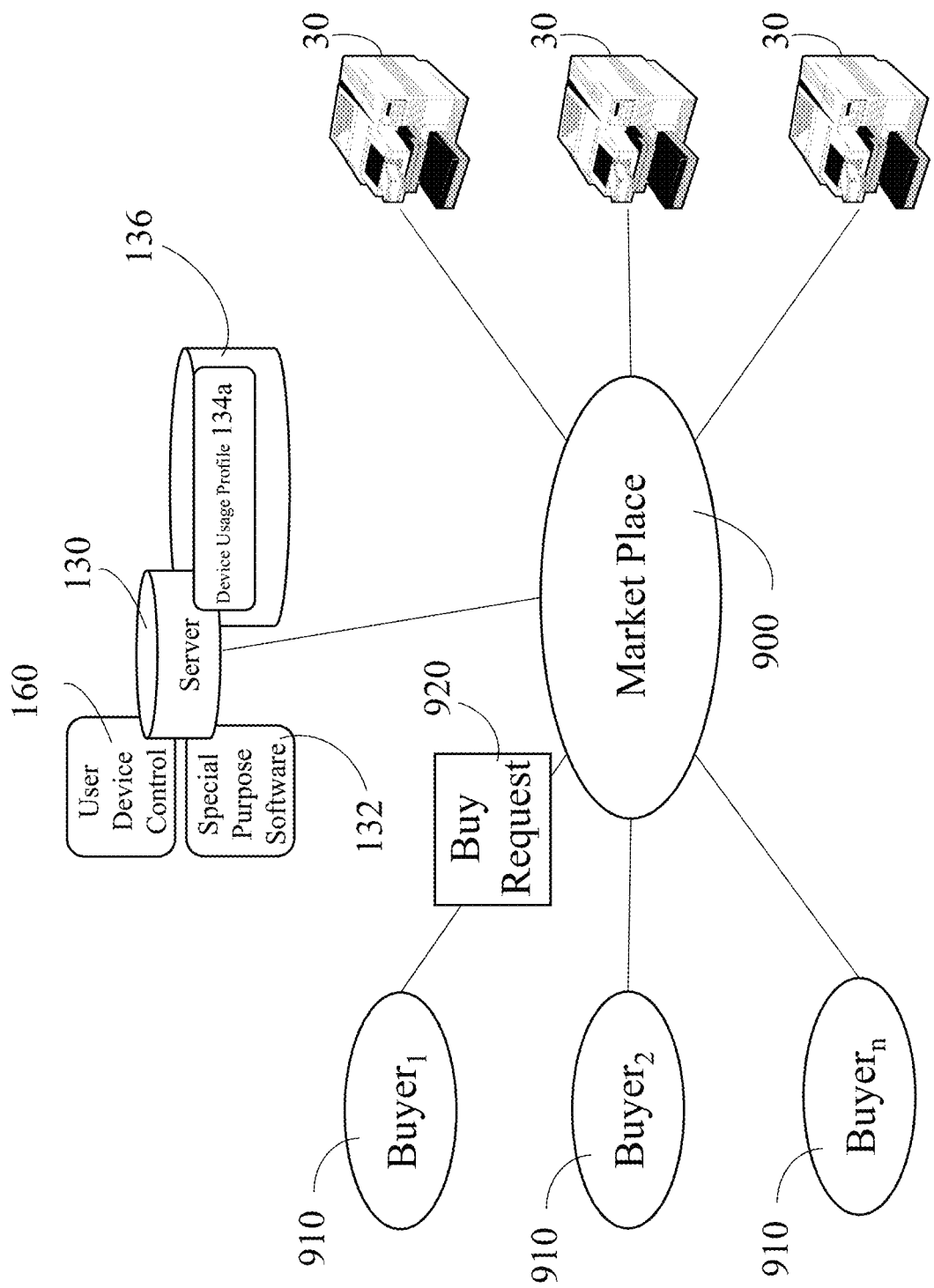
FIG. 9 is a schematic diagram of a system for matching a buyer and a seller for a device based upon total cost of ownership of the device in accordance with embodiments of the present invention.
Figure 11:
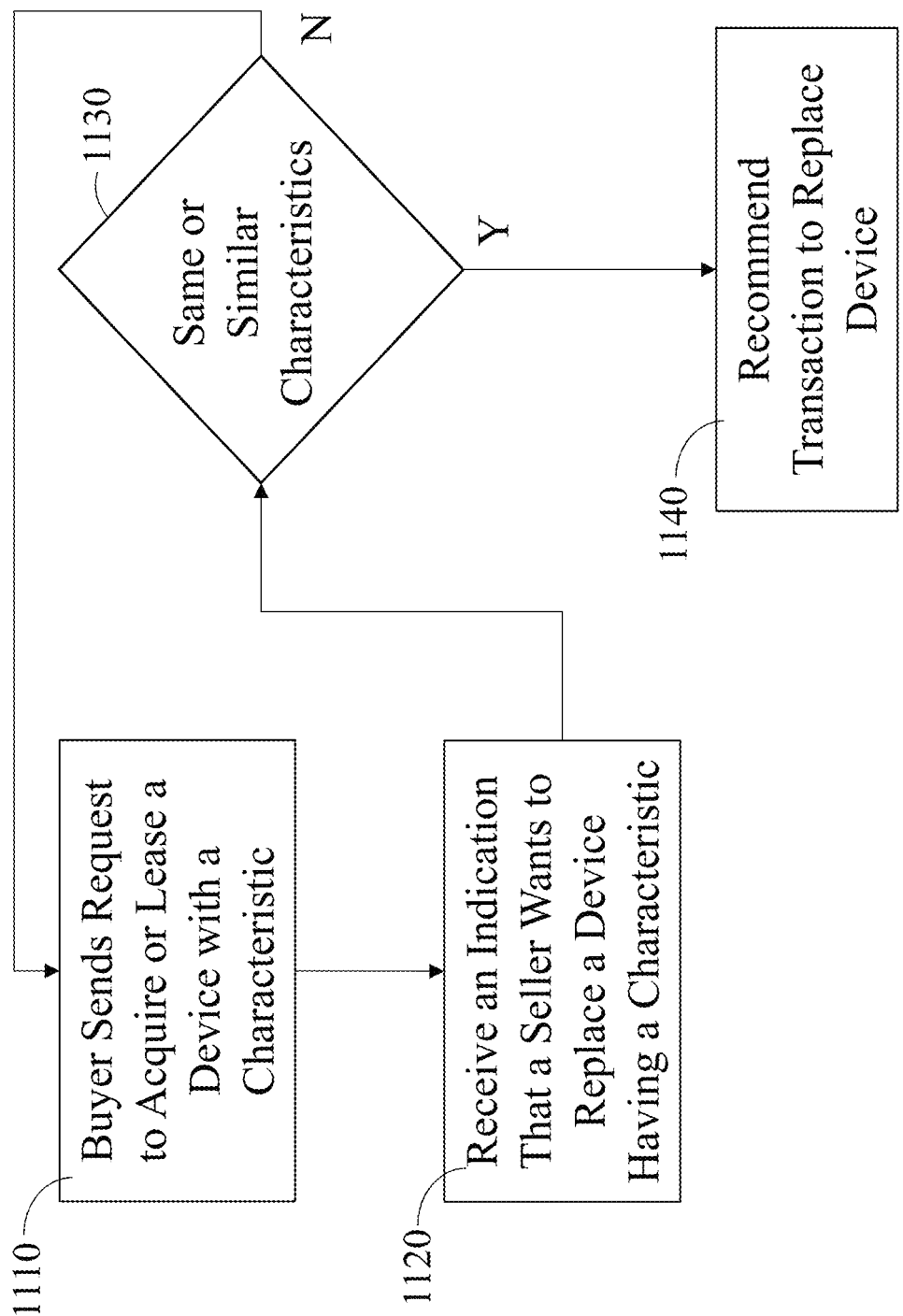
FIG. 11 is a flow diagram of a method for matching a buyer and a seller for a device based upon total cost of ownership of the device in accordance with embodiments of the present invention.

In yet another embodiment of the present invention, usage data is used as part of a method for brokering a transaction between a current device owner/lessee and a potential buyer for the device. Referring next to FIGS. 9 and 11, a system and method for carrying out this embodiment of the present invention is disclosed and will be discussed in more detail. As with other embodiments of the present invention, collecting, storing and analyzing usage data of a device in accordance with the present invention enables stakeholders to exercise greater control over the selection of a device in a way that ensures that the device is optimized to the stakeholder's actual usage. The present invention not only works for device owners/lessees, and device manufacturers and authorized personnel, but also for third parties interested in devices that are being replaced. This embodiment of the present invention is thus directed to a system and method for brokering a transaction with a third party—with the first and second parties being the device owners/lessees, and the device manufacturers and authorized personnel. As with other embodiments, usage data from a target device is used to calculate a total cost of ownership of that device. Together with specifications for the target device, the TCO is packaged as an offering in a marketplace within which sellers and buyers can enter into transactions. Similar to other online marketplaces, the present invention facilitates a transaction between a buyer and a seller based upon certain criteria agreed upon between these two parties. In essence, the buyer defines what it wants to buy, and the seller defines what it wants to sell. When there is a match, a transaction between the seller and buyer for the target device is facilitated. However, by using actual device usage data to calculate a total cost of ownership, this embodiment of the present invention provides a novel and inventive improvement over the prior art. In other embodiments of the present invention, a recommendation is generated and transmitted to a stakeholder for a transaction to replace a target device with a replacement device that is better suited and specified for the stakeholder's actual usage of the device, as determined from device usage data, and that provides a lower and/or improved total cost of ownership. Likewise for this embodiment, except that the recommendation additionally identifies a potential buyer of the device being replaced based at least in part upon that buyer's "buy" criteria. including a desired cost of ownership.

In accordance with this embodiment of the present invention, market place 900 of FIG. 9 enables any of a plurality of buyers 910 to purchase, lease or otherwise acquire one or more devices 30 based upon a TCO of the devices 30, and a TCO specified by a buyer 910. Using a user device 20 having a user device control 160 installed and operational therein, a buyer 910 may send a buy request containing various characteristics of the device the buyer desires to acquire or lease, e.g., type of device, device specifications, TCO value or range, purchase, lease or acquisition terms, etc., as a buy request 920 in the market place 900, as illustrated at step 1110 of FIG. 11. The user device control 160 connects the buyer to the market place 900, which is enabled and facilitated by the server 130 and server special purpose software 132. As previously discussed, usage data from a device 30 is collected by a smart box 110 and stored in server memory as a device usage profile 134a, 154a. A recommendation to replace a device, as in steps 812 of FIG. 8A and 834 of FIG. 8B, may be received as an indication that a seller wants to replace a device, as in step 1120 of FIG. 11. Alternatively, a seller may indicated a desire to sell outside of the method of FIG. 8A or 8B. In either case, the seller indication contains a characteristic of the device being offered for sale or lease by the seller. In a preferred embodiment, at least one of the characteristics of the buyer and seller is a total cost of ownership of the device being sought (for the buyer), and/or of the device being sold (for the seller). The server special purpose software 132 compares the characteristic contained in a buy request 920 with a characteristic of the seller's device to determine if the characteristics are similar or the same, i.e., to determine if the buy request 920 can be satisfied by the device being replaced, step 1130 of FIG. 11. In that case, the present invention provides a recommendation for a transaction for the buyer 910 and device being replaced, step 1140 of FIG. 11. If the buyer accepts the recommendation, the transaction proceeds.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A method for recommending a transaction to replace an in-use device based upon the total cost of ownership of the device determined using usage data of the device, the method performed by a server connectable to a network and having a processor and memory, wherein the memory stores server special purpose software and a device usage profile associated with the in-use device, the method comprising the steps of:

receiving usage data of the in-use device to be stored in the device usage profile;

receiving a target total cost of ownership savings value;

identifying a candidate replacement device based upon at least one of user input and the usage data of the in-use device;

predicting a total cost of ownership of the candidate replacement device based upon the usage data of the in-use device;

comparing the total cost of ownership of the candidate replacement device and the total cost of ownership of the in-use device; and providing a recommendation for a transaction to replace the in-use device with the candidate replacement device when the difference between the total cost of ownership of the candidate replacement device and the total cost of ownership of the in-use device is greater than or equal to the total cost of ownership savings value.

2. The method according to claim 1, further comprising the steps of providing a data collection device capable of collecting usage data from the in-use device and causing the usage data to be transmitted to the server.

3. The method according to claim 1, wherein the usage data of the in-use device comprises at least one of type of job usage, time of usage, device component usage, and volume usage.

4. The method according to claim 3, wherein a replacement device profile for at least one replacement device contains a characteristic of the candidate replacement device, and wherein the step of determining the candidate replacement device further comprises comparing the device usage profile with the replacement device profile and determining the candidate replacement device when the characteristic of the candidate replacement device contained in the replacement device profile is similar to a characteristic of the in-use device contained in the usage device profile.

5. The method according to claim 2, wherein the device is connectable to a network, and wherein the data collection device comprises a smart box connectable to the network, the smart box having a processor and memory having stored therein general purpose software, and having storable therein smart box special purpose software.

6. A method according to claim 1, wherein the memory of the server is remote from the in-use device.

7. The method according to claim 1, further comprising the step of providing a user interface for display on a user device, the user interface enabling a user of the user device to access information about the device.

8. The method according to claim 7, further comprising the step of receiving target total cost of ownership savings value from the user via the user interface.

9. A system configured to recommend a transaction to replace an in-use device based upon a total cost of ownership of the in-use device, the transaction being initiated using a user electronic device, the user electronic device being connectable to a network, the system comprising:
   a smart box connectable to the network and to the in-use device, the smart box having a processor and memory having stored therein general purpose software, and having storable therein special purpose software;
   a server connectable to the network and having a processor and memory, the memory having stored therein server special purpose software and a device usage profile associated with the in-use device; and
   a user device control installable on or accessible by the user electronic device, wherein the user device control enables a user of the user electronic device to initiate a transaction to replace the in-use device;
   wherein the smart box special purpose software is configured to cause a smart box processor to collect usage data of the in-use device, and to cause the usage data of the in-use device to be stored in the device usage profile; and
   wherein the server special purpose software is configured to cause a server processor to receive a predetermined target total cost of ownership saving value, identify a candidate replacement device based upon at least one of user input and the usage data of the device, predict a total cost of ownership of the candidate replacement device based upon the usage data of the device, compare the total cost of ownership of the candidate replacement device and the total cost of ownership of the in-use device, and provide a recommendation for a transaction to replace the in-use device with the candidate replacement device when the difference between the total cost of ownership of the candidate replacement device and the total cost of ownership of the device is greater than or equal to the predetermined total cost of ownership savings value.

10. The system according to claim 9, wherein the recommendation provided by the server processor further identifies a potential purchaser for the in-use device to be replaced.

11. The system according to claim 9, wherein the recommendation provided by the server processor further identifies a potential seller of the candidate replacement device.

12. The system according to claim 11, wherein the candidate replacement device was formerly used device and replaced by the potential seller.

* * * * *